United States Patent [19]

Korff et al.

[11] 3,932,094
[45] Jan. 13, 1976

[54] MULTIPLE STATION PLASTIC PIPE BELLING MACHINE

[75] Inventors: Wolfram G. Korff, Granada Hills; Vernon V. Emery, Sun Valley; Joseph Kim Bond, North Hollywood; Robert S. Hash, Mission Hills, all of Calif.

[73] Assignee: Emery Company, Inc., Pacoima, Calif.

[22] Filed: June 17, 1974

[21] Appl. No.: 479,756

[52] U.S. Cl. ......... 425/393; 425/DIG. 218; 264/318
[51] Int. Cl.² .................................. B29C 17/00
[58] Field of Search ....... 425/64, 65, 397, 455, 315, 425/302, 297, 305 R, 389, 392, 393, 122, 402, 450.1, 507, 508, DIG. 39, 130; 264/296, 322, 297

[56] References Cited
UNITED STATES PATENTS

| | | | |
|---|---|---|---|
| 2,945,077 | 7/1960 | Polk | 236/15 B |
| 3,205,535 | 8/1965 | Niessner et al. | 425/297 |
| 3,672,804 | 6/1972 | Dalik | 425/455 |
| 3,806,301 | 4/1974 | Osterhagen et al. | 425/393 |
| 3,812,909 | 5/1974 | Rogalsky et al. | 214/339 |
| 3,852,015 | 12/1974 | Stanbury | 425/392 |

*Primary Examiner*—Robert L. Spicer, Jr.
*Assistant Examiner*—R. J. Charvat
*Attorney, Agent, or Firm*—William H. Pavitt, Jr.

[57] ABSTRACT

A multiple station plastic pipe belling machine in which an endless conveyor periodically receives one of a series of plastic pipes as each pipe is dumped from a V-trough receiving such pipes in sequence after their extrusion and cutting into predetermined pipe lengths, disposes the pipes so received parallel to, but spaced from, each other and advances the thus-disposed pipes in predetermined increments; positions the pipes in such a manner that their ends to be belled are first passed in such increments through a heater adjacent the edge of the endless conveyor, while the pipes are continuously rotated until each pipe passes out of the heater and is then carried in such increments by the endless conveyor into the first of a plurality of belling stations where a pair of semi-circular clamps encircle the pipe end and a mandrel or plug is inserted therein. After insertion of the plug, the clamps are removed and the thus-plugged pipe is further moved incrementally through several additional belling machine stations in a cooling area until the pipe end is sufficiently cooled, whereupon the plug is withdrawn so that the pipe may be further advanced by the endless conveyor for discharge from the machine. As soon as one pipe is moved into the cooling area from this first clamping and plugging station, the next pipe is clamped and belled in that station. The plugs project from blocks which, after first being moved into the first station transversely to the path of the pipe end carried by the endless conveyor, thereby to enable the plug to be inserted in a pipe end, are then moved along the incremental path of the pipe end to the last belling station, whereupon the block is moved back transversely from and out of said path to a point behind the other blocks so that it may be shifted back behind the other blocks to a position for removement back into the first station. All movements of the machine are synchronized through appropriate clutching, gearing, sprocket and chain devices, and this synchronism is characterized by being of predictable and repeatable time span.

11 Claims, 34 Drawing Figures

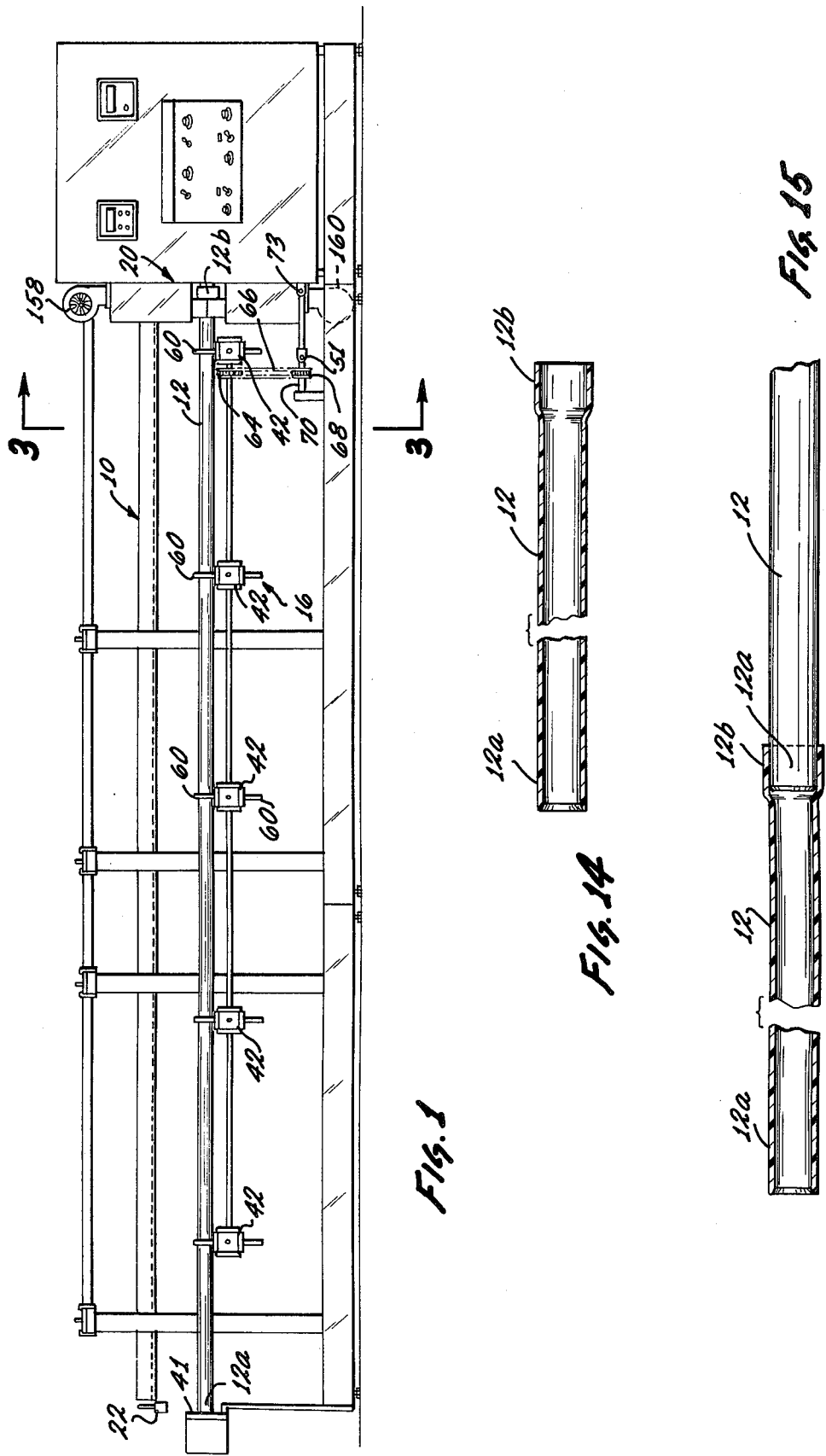

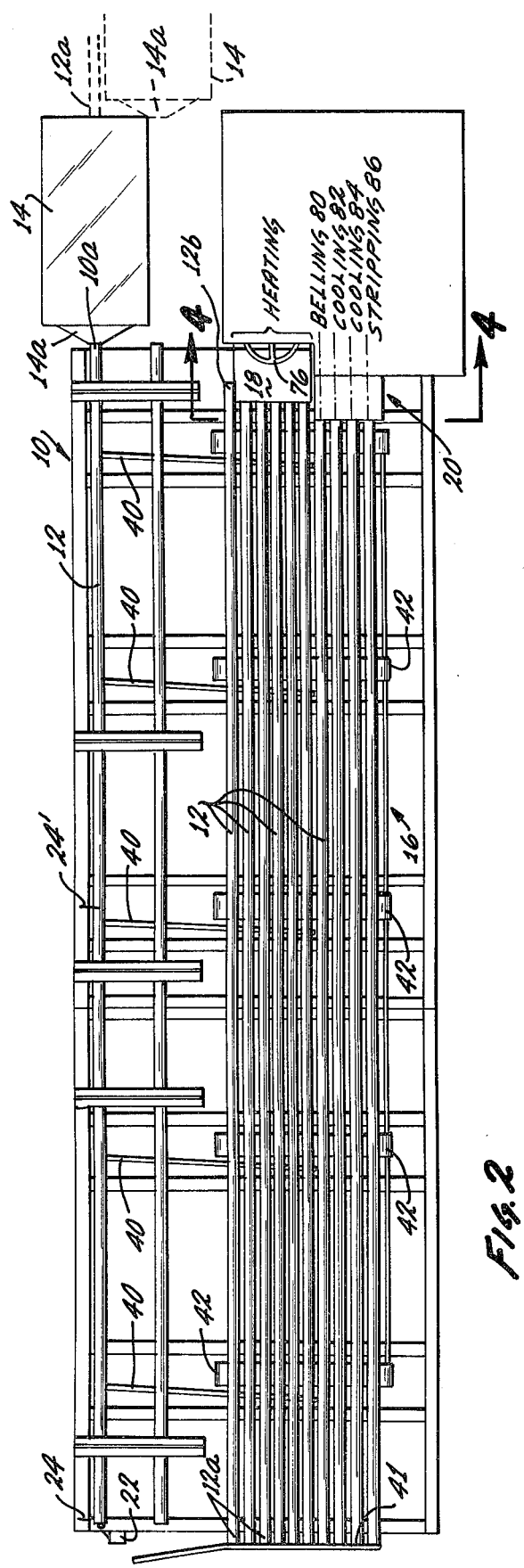
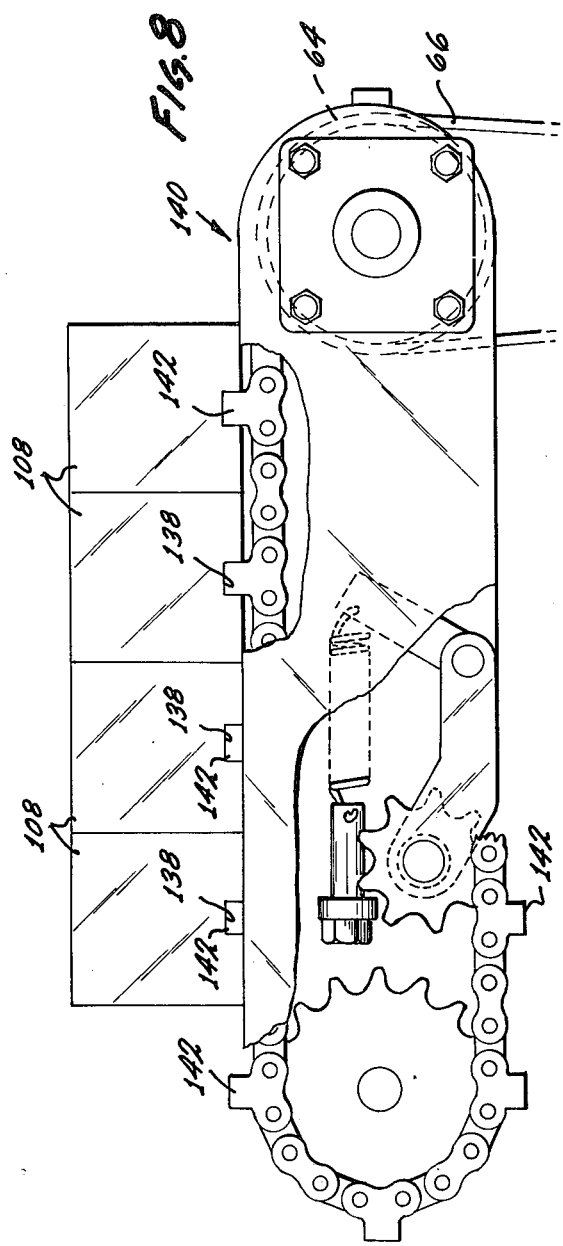

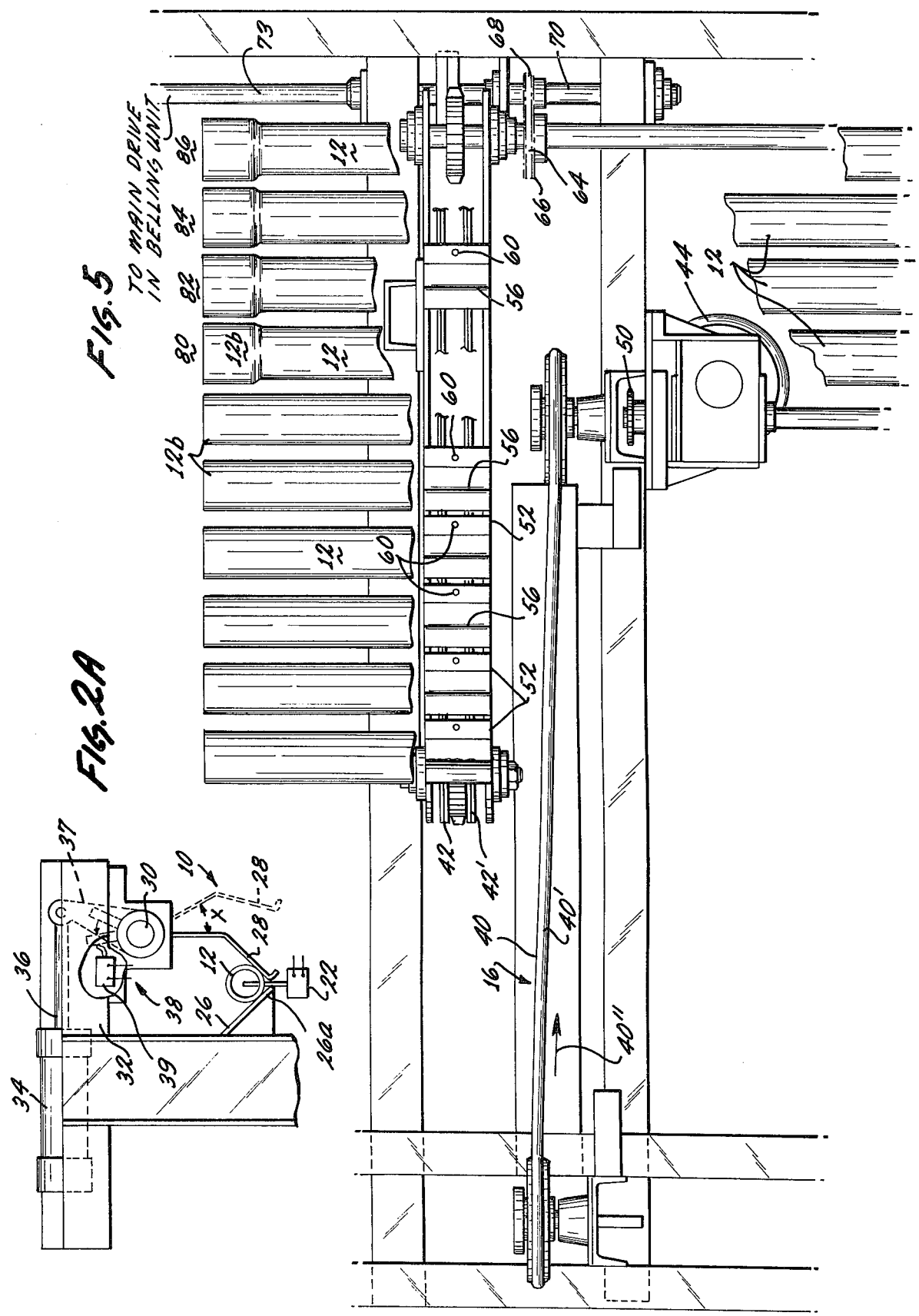

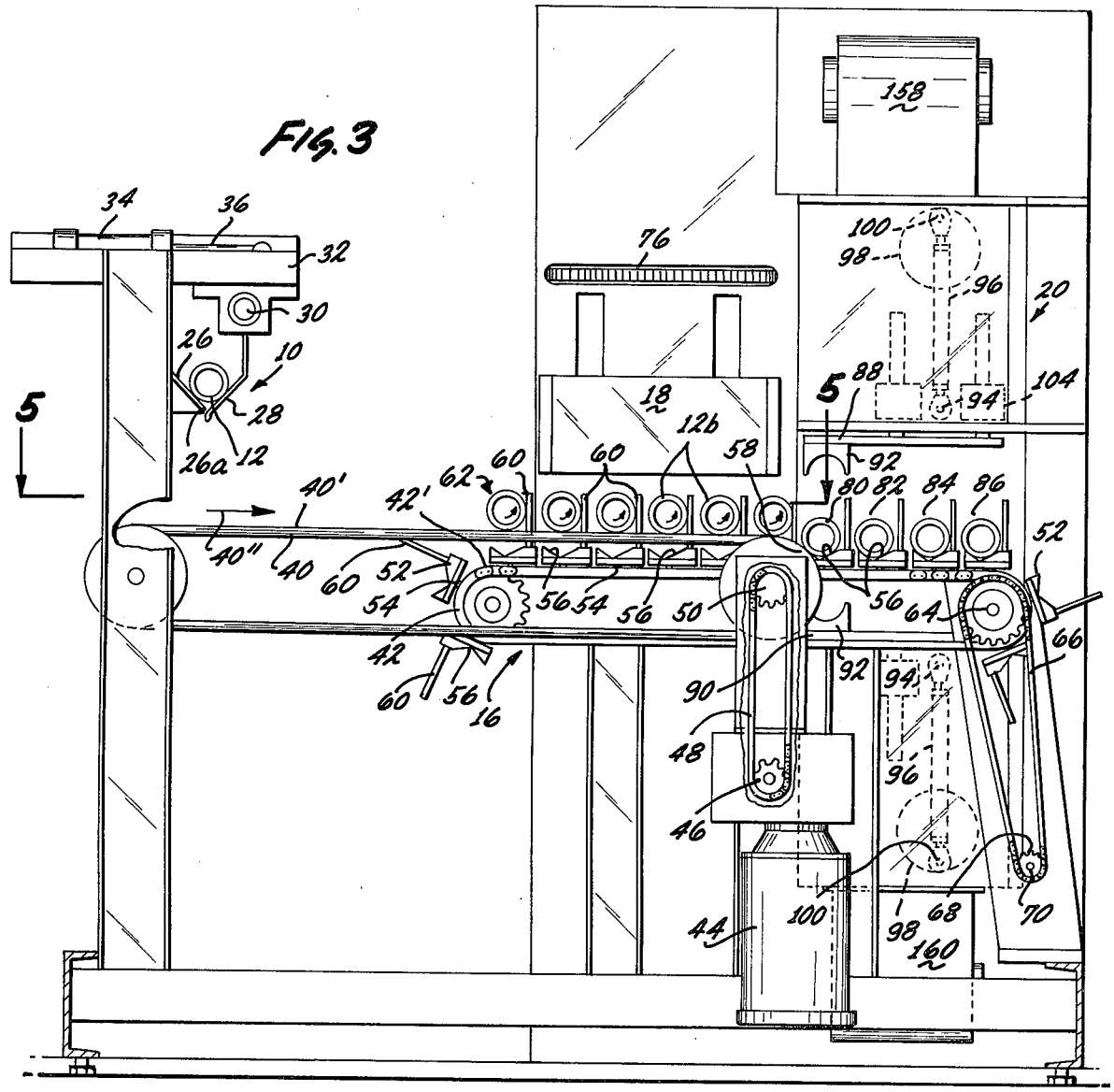

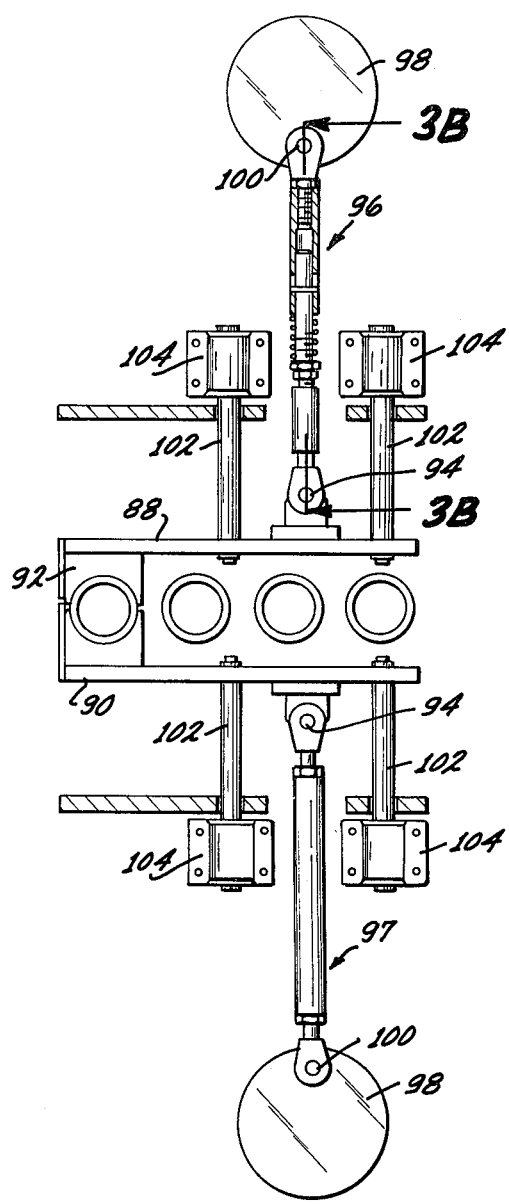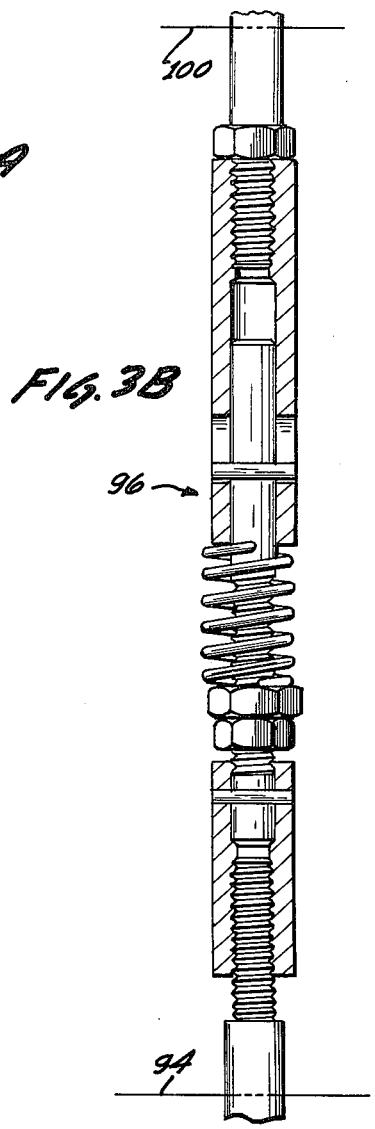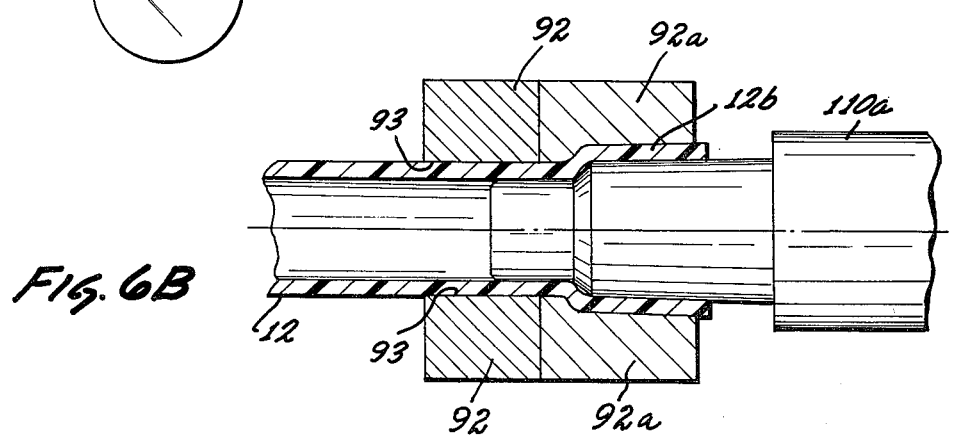

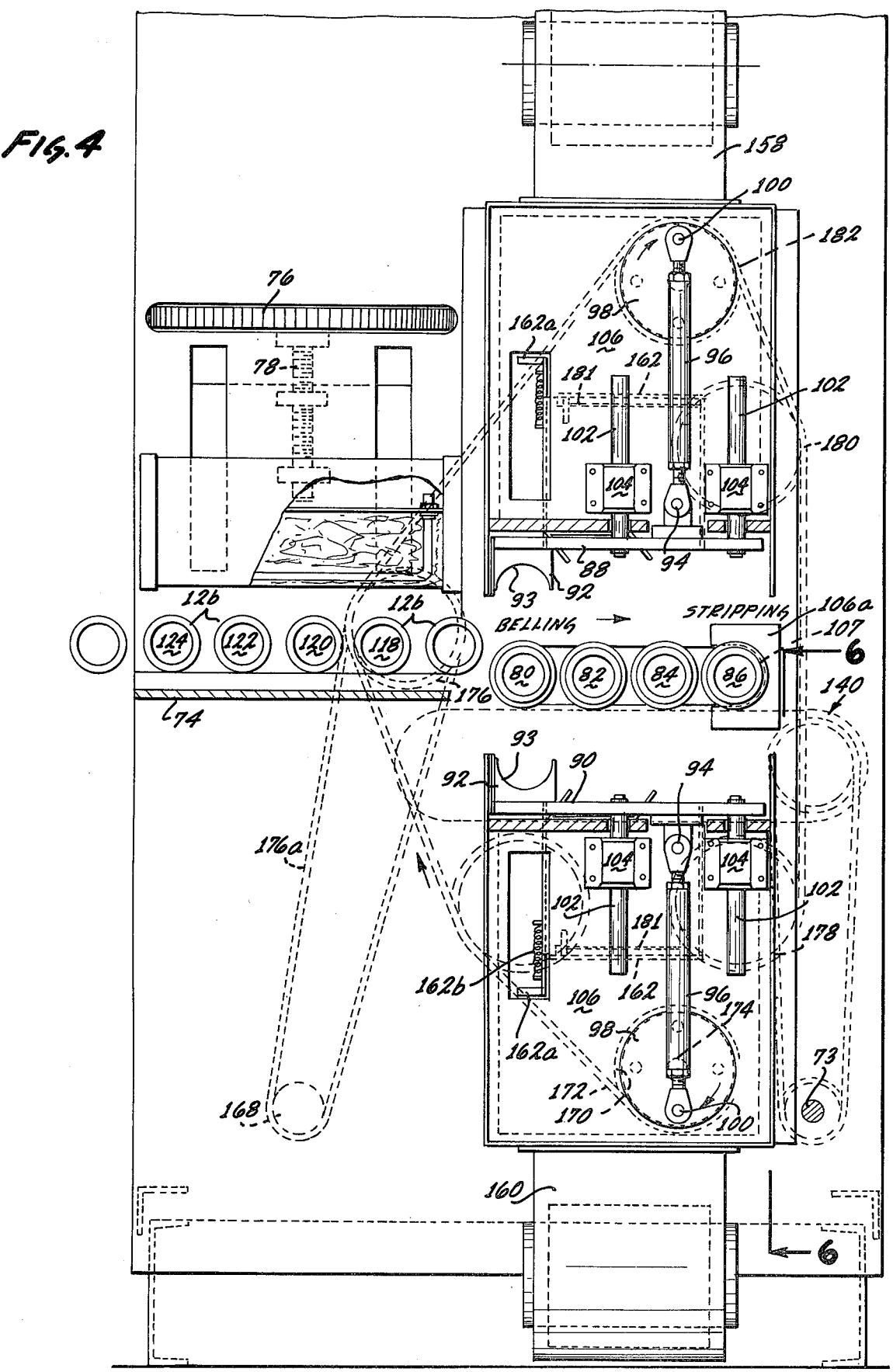

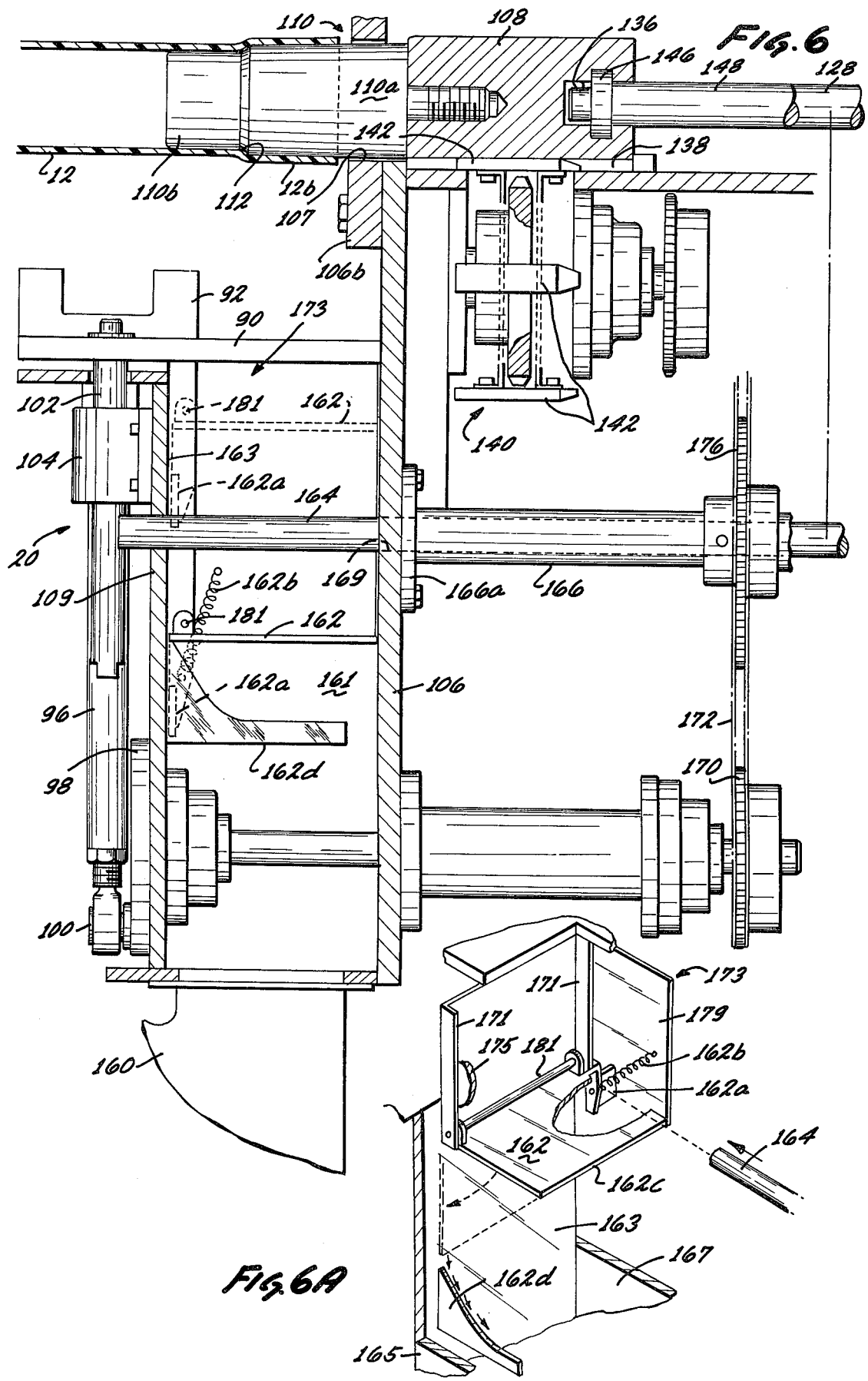

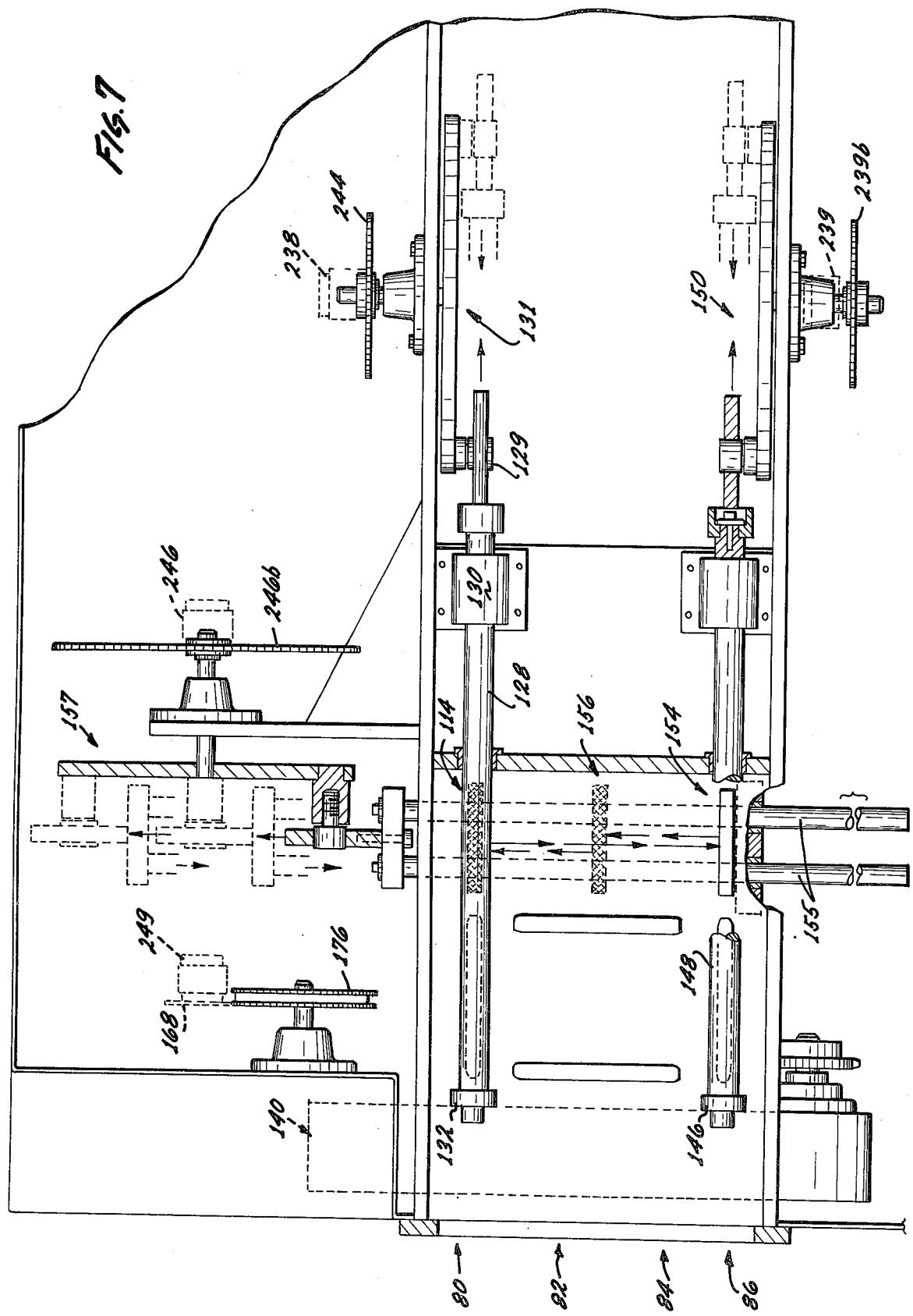

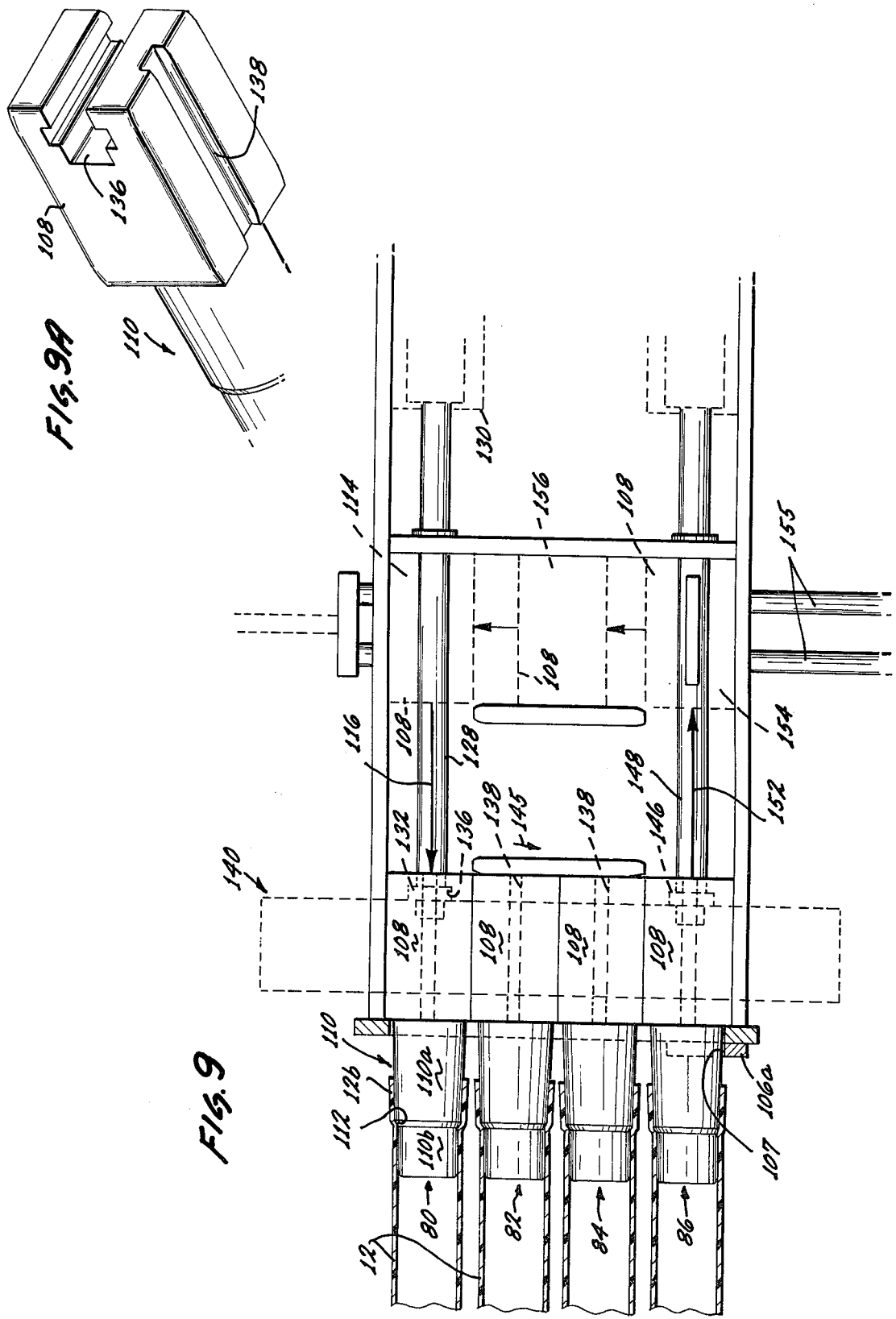

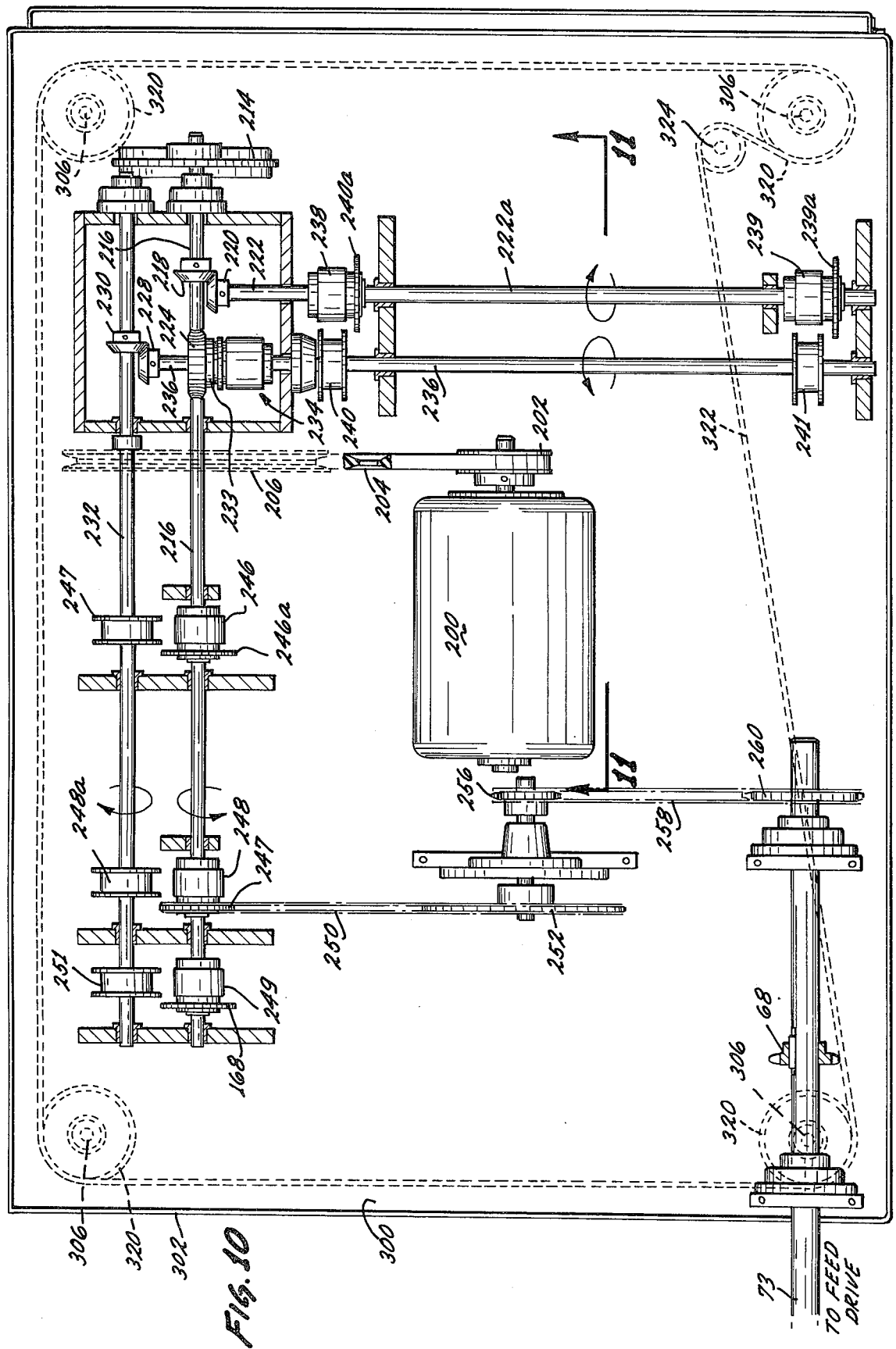

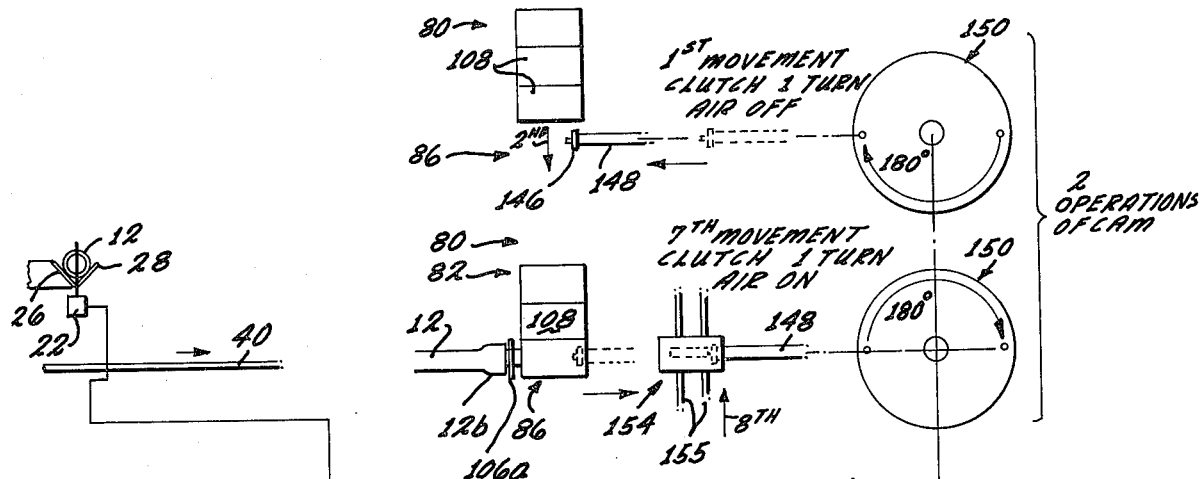
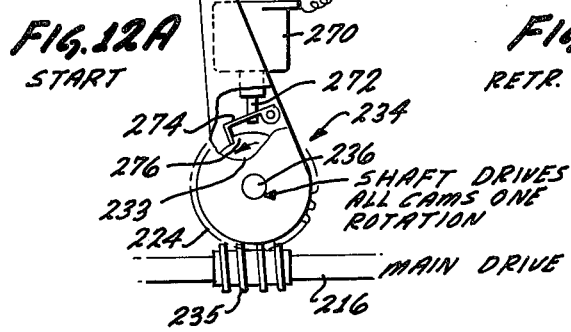
FIG.12A START
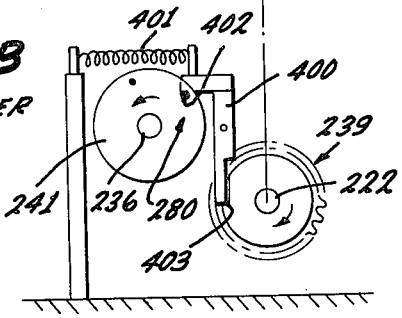
FIG.12B RETR. PLUNGER
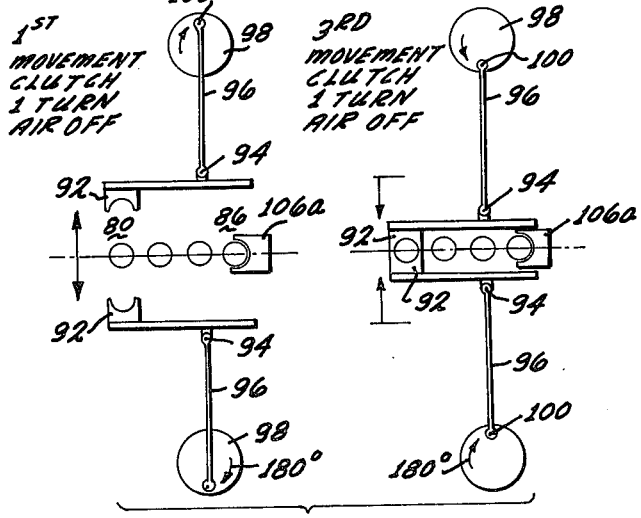
FIG.12C CLAMPS
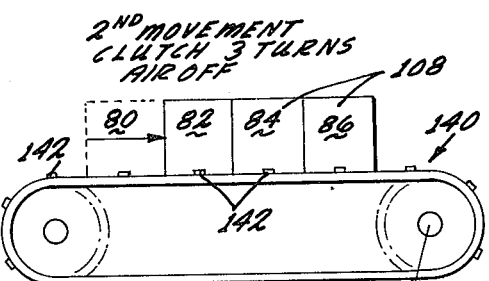
FIG.12D CONVEYOR
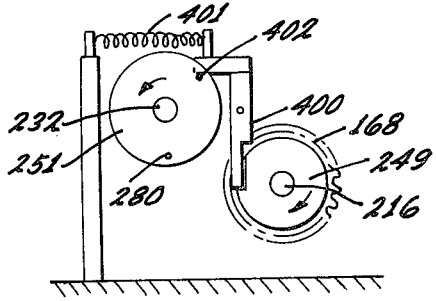

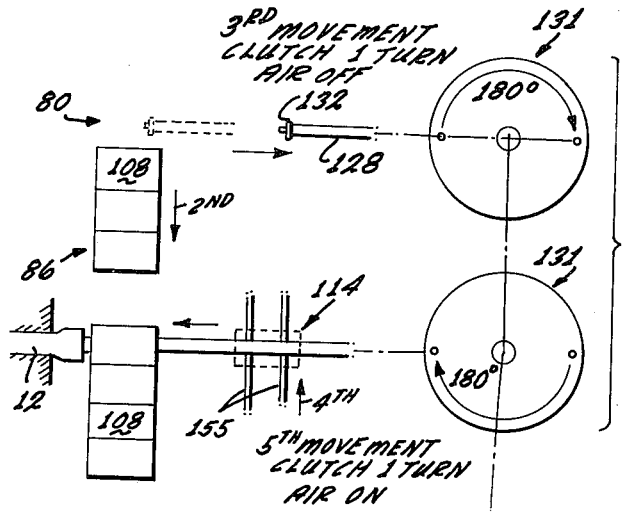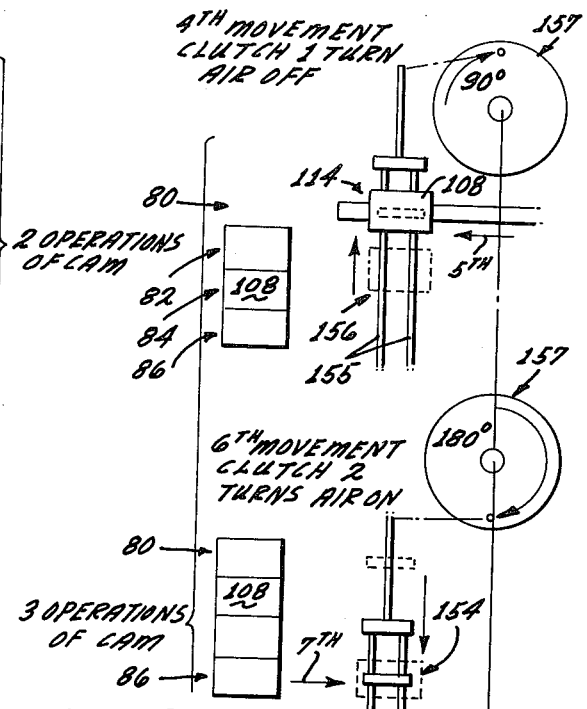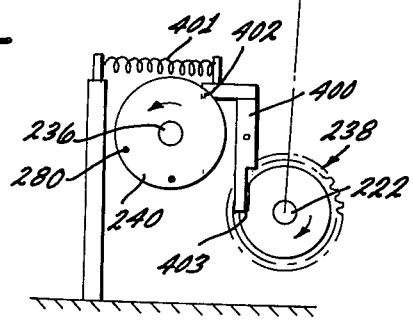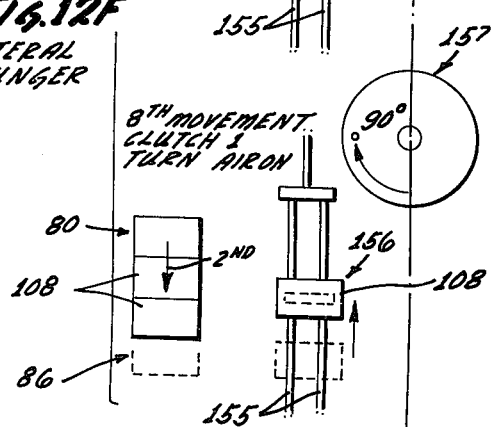
FIG.12E
BELL PLUNGER
FIG.12F
LATERAL PLUNGER
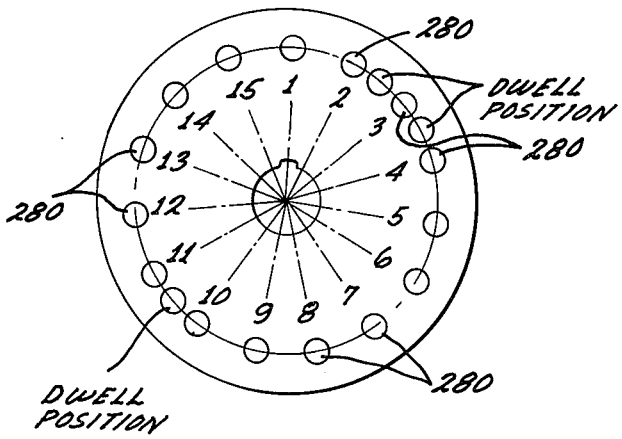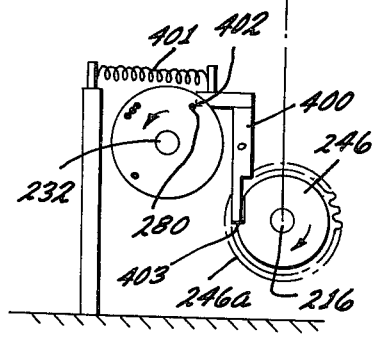
FIG.13

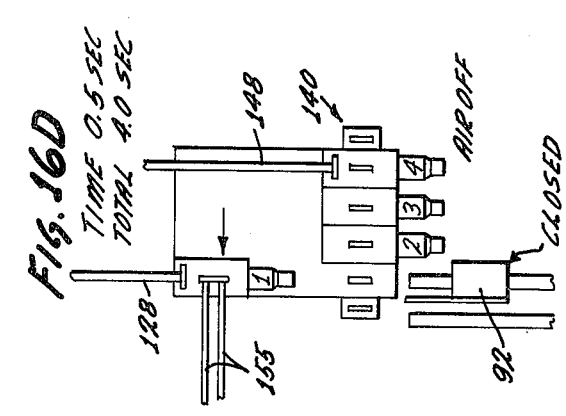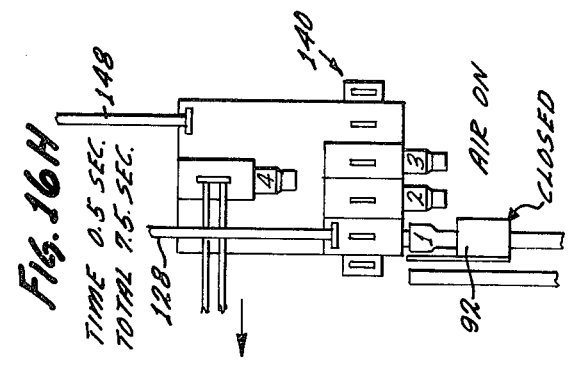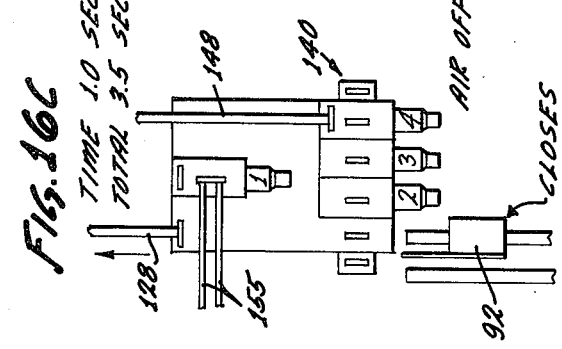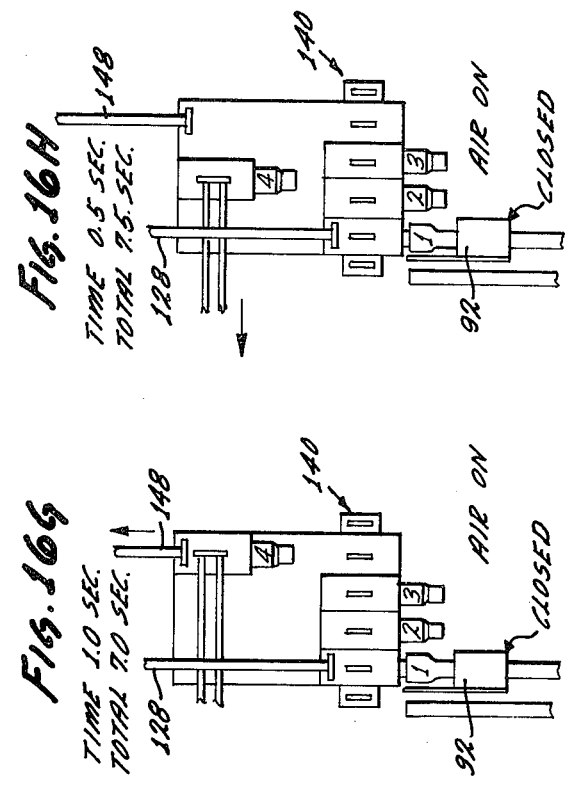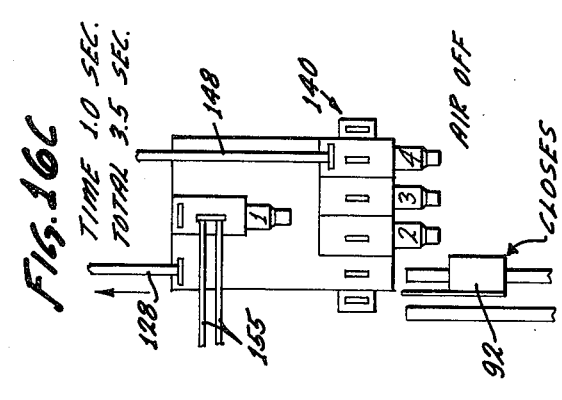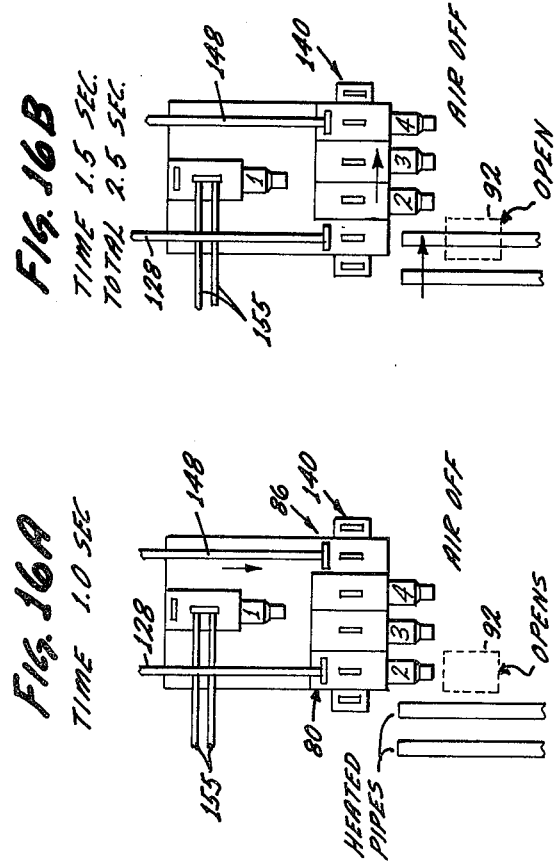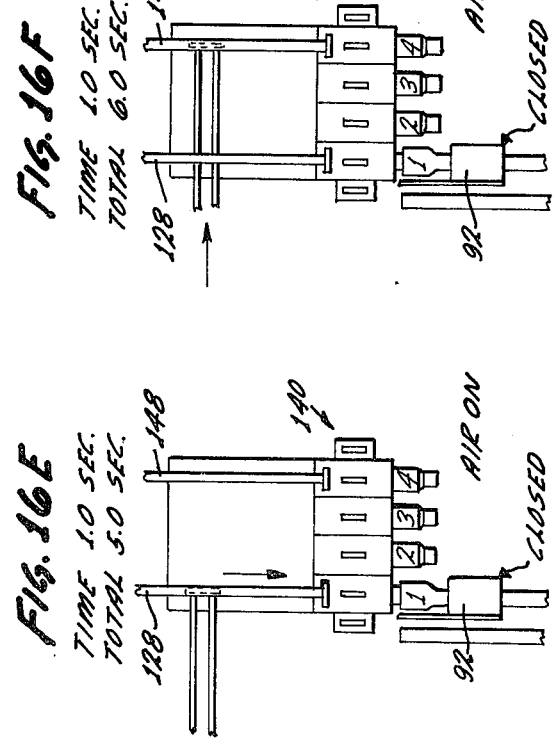

MULTIPLE STATION PLASTIC PIPE BELLING MACHINE

BACKGROUND OF THE INVENTION a. Field of the Invention

This invention relates generally to apparatus for belling the ends of plastic pipe, and, in particular, to apparatus for providing a greatly accelerated rate for receiving cut plastic pipe and belling the same.

b. Description of the Prior Art

Within the last two decades, plastic piping has been accepted for a multitude of uses. It is ordinarily produced by a process of continuous extrusion and cut into desired lengths. The preferred manner of joining these lengths is by providing one end of each pipe with a "bell" of expanded inside diameter such that it permits a close fit within such belled end of the unbelled end of another pipe to be joined end-to-end thereto.

The belling process, as illustrated by the following patents and patent applications, viz. U.S. Pat. Nos. 3,360,826; 3,553,780 and 3,205,535. British Pat. No. 1,087,168 and U.S. patent applications Ser. Nos. 62,100 and 41,267 essentially involves conveying the pipe to be belled to a location where its end is disposed in proximity to a heater for softening, and a mandrel is inserted in the softened end to expand it into contact with some type of surrounding mold or clamping device to shape the outside of the pipe end. The thus-expanded pipe end must then be cooled so that the plastic sets in this outwardly forced new configuration. After cooling, both the mold or clamp and the mandrel are removed.

In all such belling apparatus heretofore devised, the belling process has been found to delay production of belled plastic pipe. Thus, extrusion and pulling the pipe from the extruder may occur at a rate as high as 2 feet per second. Cutting of the pipe with a saw may be almost instantaneous. Conveyors may be constructed to carry pipe as rapidly as each cut length of pipe is deposited in a conveyor. The belling process, however, has not been anywhere near as rapid. This is because it takes time both to heat up the pipe end for insertion of the mandrel or plug, and then to cool it down after the mandrel has been so inserted in the heatsoftened pipe end. At a very minimum, a period in excess of 30 seconds has been required to accomplish the belling of the end of a pipe.

Because of this time requirement of the belling process, either a belled-pipe manufacturing production line cannot be operated at the full speed of the extruder, puller, cutter and conveyor; or provision must be made to have the cut pipe lengths delivered sequentially to a battery of separate belling machines. The first alternative is costly from a production time standpoint, or may require that pipe production prior to belling be entirely separated from the belling operation, thereby introducing expensive handling and storage factors. The other alternative introduces some complex pipe-handling and transfer problems and also requires the pipe producer to purchase, set up and maintain the battery of separate belling machines.

Thus, prior to the present invention, the state of the art has been such that the belling of plastic pipe has constituted a severe limitation upon what would otherwise comprise a rapid pipe production line, with resultant increase in the cost of producing lengths of belled plastic pipe.

SUMMARY OF THE INVENTION

The present invention solves the principal production line problem created by belling machines heretofore available for use in plastic pipe production apparatus. The solution is accomplished by providing a multiple station plastic pipe belling apparatus in which belling may be accomplished at approximately the same rate at which sections of plastic pipe are pulled from the extruder, cut and conveyed away therefrom. To this end, in the apparatus of the present invention, as each cut section of plastic pipe arrives at a predetermined point in a V-trough from a pipe cutter, it triggers a switch which sets in motion with an entire synchronized system, commencing with the dumping of such section of plastic pipe onto an endless belt conveyor. This conveyor, upon receipt of a particular length of pipe, while constantly rotating the same, moves it both in a direction transverse to the direction in which the plastic pipe has been pushed in said V-trough, as well as slightly further in said direction until one end of the pipe comes into contact with a stop or positioning plate. This vectoral direction is accomplished by disposing the axis of the endless belt conveyor at an angle to the V-trough, thereby imparting a slight helical movement to the pipe length so that, as the belt rotates, it works the pipe, both transversely as well as in the direction the pipe has been pushed in the V-trough. As the pipe is thus worked to where its leading end contacts a stop or positioning plate, it is picked up by one of the discrete sections of a second endless-conveyor which periodically moves transversely to the direction of the V-trough in predetermined increments. The positioning plate is so located that it disposes the opposite end of the pipe to project beyond the edge of the second endless conveyor a predetermined distance in order that such end of the pipe may pass through a heating area while it is still being continuously rotated by the endless belt conveyor.

As soon as the pipe end passes out of the heater area, it moves beyond the belt conveyor so as to cease further rotation, but, as it passes from the heater by its last incremental movement, it arrives at a first belling station. Upon such arrival, the cool and thus rigid area of the pipe just behind the heat-softened end is immediately surrounded by a pair of semi-circular clamps, the inside diameter of which is equal to the outside diameter of the pipe. This may be accomplished by a pair of synchronized crank means. One of the pair of clamps (preferably the lower one) is brought to a rigidly held position which aligns the clamp's center axis, and hence the axis of the pipe which the clamp surrounds, precisely with the axis of the belling mandrel for concentric entry by the latter into the pipe. The other of the clamp pair has a path of movement which, if there should be no obstruction, would permit it to travel slightly further than the point at which the axes of the two clamp halves would coincide. The crank means by which the upper clamp half is brought downwardly into position is spring-loaded so that the portion of the pipe disposed in the orifice defined by the two clamp halves is positively squeezed between them, even if the pipe diameter is somewhat irregular. The clamp friction thus achieved serves to maintain the pipe in its position against any longitudinal force acting against it by the belling mandrel when the latter is inserted in the softened pipe end. Holding of this predetermined position without permitting the pipe end to creep, is necessary to achieve and maintain the prescribed belling depth.

As soon as the clamps have firmly gripped the pipe, a mandrel is thrust coaxially into the softened pipe end protruding from the clamps to expand the same radially, forming the desired inside configuration as defined by the shape of the mandrel. For most belling requirements the outside surface of the belled pipe end need not be enclosed, so that the pipe end merely free-forms as a result of expansion from the inside. However, for certain critical bell configurations the clamping halves may be so constructed as to extend from the normal gripping area on the pipe toward the softened end of the clamped pipe, incorporating an inside diameter equal to the pipe diameter within the clamping length and an appropriately greater diameter for the belled length, including a desirable angle of inclination at the point of transition.

Adjusting means incorporated in the upper clamp crank arm permits the clamping pressure to be varied as required, i.e. light pressure for smaller diameter and/or thin wall pipes to prevent crushing, and higher pressure for larger diameter and/or thick wall pipes, which may be subjected to greater longitudinal forces during mandrel insertion.

A further important purpose of providing adjustable clamping pressure is to set the same to such a value as is needed to prevent slipping or creeping of any given size and type of pipe during the belling of the properly heated pipe end, yet to actually permit slipping of the pipe when the mandrel is inserted into an improperly heated or unheated pipe end, thereby preventing jamming of the mechanism. Improper heating may occur as a result of maladjustment or failure of the heating means. Clamp pressure adjustment may thus provide fail-safe means to assure continual machine operation even under adverse conditions.

In the first belling station, the mandrel is thrust into the pipe end by the movement of a mandrel-bearing block from a position rearward of a series of blocks disposed in several further parallel belling stations. After the mandrel has been inserted into the pipe end in the first belling station, the two semi-circular clamps are separated from each other so that the pipe, with the mandrel inserted in its heat-softened end, may now be moved to the second belling station. This second belling station is disposed in the cooling zone in which cooling air is blown about the pipe end. This cooling zone preferably extends to a third and a fourth belling station into which each block with its projecting mandrel is moved sequentially to coincide with incremental movement of the pipe by the endless conveyor. As the hot pipe end is being cooled in these subsequent stations with the mandrel still inserted, the plastic shrinks tightly on the stepped-up portion of the mandrel. It is this shrinkage over the solid core until cooled to approximately room temperature that maintains dimensional integrity of the interior of the bell end. When the pipe reaches the fourth belling station, the mandrel in the pipe end is withdrawn by movement of its block to the rear of the blocks disposed in the second and third belling stations. With such withdrawal of the mandrel, the belled pipe may now be moved by the endless conveyor to discharge the pipe from the apparatus.

In order to accomplish the operational steps which have thus been described, the movement of the various components which move periodically in increments or in reciprocating fashion, must be synchronized. To accomplish such synchronization, a special drive system is provided in the belling unit, which drive system is coupled through a universal joint to the conveyor drive system. The entire system cycles each time a pipe arrives at a certain point in the V-trough and trips an electrical micro-switch; and, once a pipe has been dumped from the V-trough onto the endless conveyor, the apparatus is thereby, or by independent timed means, actuated to start one complete cycle, after which it stops and waits for the next successive actuation signal from either another pipe tripping of the micro-switch or from said independent timed means. Each successive complete cycle moves the pipes in the order of their entry incrementally through the heater and through the belling stations until they are discharged from the apparatus.

It may be seen, therefore, that with the present invention, the time required for both heating and cooling a single pipe and has not been made a limiting factor in the production line. Instead, in the particular embodiment of the invention herein described with reference to the drawings, three other pipes are simultaneously undergoing various stages of heating, belling and cooling, with the result that once the apparatus is placed in continuous operation, it in effect delivers a belled pipe at such fraction of the time normally required as is determined by taking such time as a numerator and dividing it by a denominator equal to the number of belling stations in the belling unit. While the belling unit hereinafter described provides four such belling stations, thereby to cut belling time to one-fourth of normally required belling time, it would obviously be possible to provide more or less stations and thereby increase or decrease belling time respectively.

BRIEF DESCRIPTION OF THE DRAWINGS

In the accompanying drawings,

FIG. 1 is a front elevation of the apparatus;

FIG. 2 is a plan view of the apparatus shown in FIG. 1;

FIG. 2A is a detail of the V-trough and switching mechanism;

FIG. 3 is an elevational view of the heating and belling units looking in the direction of the arrows in FIG. 1 and showing the frame and conveyor in section along the lines 3—3;

FIG. 3A is an enlarged and more detailed elevational view of a portion of the belling units shown on the right-hand side of FIG. 3.

FIG. 3B is a section taken on the line 3B—3B of FIG. 3A.

FIG. 4 is an enlarged section of the heater-beller unit taken on the line 4—4 of FIG. 2;

FIG. 5 is an enlarged plan view, partly broken away, looking down in the direction of the arrows on the line 5—5 of FIG. 3;

FIG. 6 is a partial enlarged sectional view looking in the direction of the arrows 6—6 in FIG. 4;

FIG. 6A is a fragmentary perspective view of the damper mechanism shown in FIG. 6;

FIG. 6B is a fragmentary section of a pipe end not only surrounded by the clamps shown in FIG. 6, but with bell molding clamps.

FIG. 7 is a partial enlarged plan view of the beller block moving mechanism;

FIG. 8 is an enlarged detail of the endless chain which moves the blocks from their first to their fourth belling stations;

FIG. 9 is a plan view of the block movement pattern;

FIG. 9A is a perspective view taken from the rear and underside of a mandrel block;

FIG. 10 is a plan view of the main drive system;

FIGS. 12A–F are schematic diagrams of the movements of the various gears and cams by which operation of the apparatus may be synchronized;

FIG. 13 is an enlarged circular cam showing in a composite manner all pin locations utilized in the cams of FIGS. 12A–F;

FIG. 14 is a section of a pipe end after having been belled by the apparatus; and FIG. 15 is a section showing belled pipe being connected with a spigot end of another pipe.

FIGS. 16A–G are schematic diagrams showing the sequencing and timing of the movement of the pipes, belling blocks and clamps.

Figure 11:
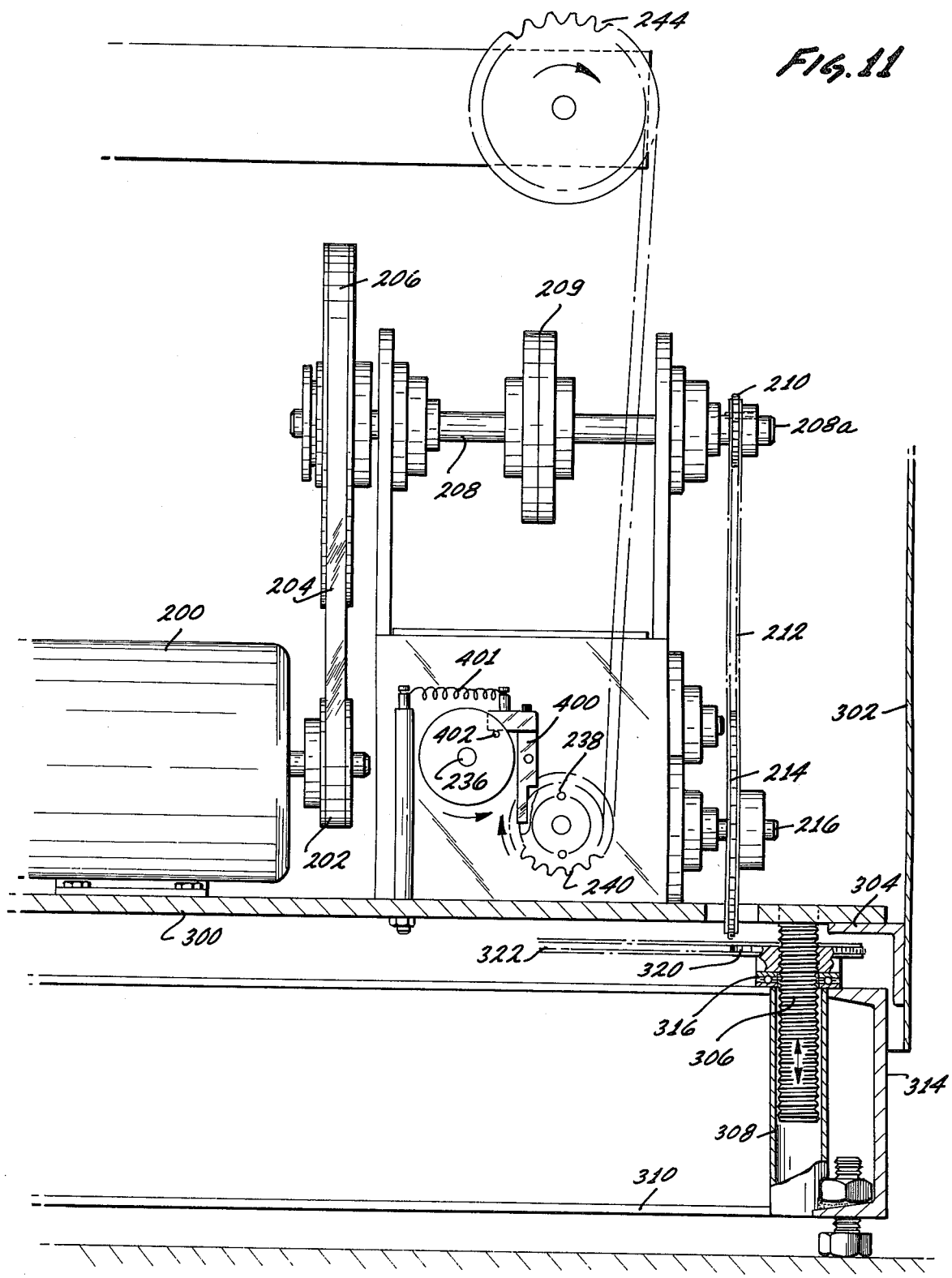
FIG. 11 is an elevation, partly in section, taken on the line 11—11 in FIG. 10 and looking in the direction of the arrows.

DESCRIPTION OF THE PREFERRED EMBODIMENT a. The Components of a Complete Apparatus As may be best seen in FIG. 2, apparatus constructed in accordance with the present invention may comprise:

i. a V-trough 10 which receives sections 12 of extruded pipe 12a pushed onto it by a saw 14 and cut by the latter into such sections 12; (ii) a transversely directed conveyor 16 which receives the pipe sections 12 dumped from the V-trough 10 and conveys and positions them so that their ends 12b project into a heater 18 through which they are carried into the belling unit 20 and finally discharged; (iii) the said heater 18; (iv) the multiple station belling unit 20; and (v) the synchronized drive system.

Although all five components listed above are shown in FIG. 2, and the V-trough 10 is included for convenience in disclosing a complete system to accomplish feeding pipe sections to the transversely directed conveyor 16, it would be possible to utilize the principal teaching of the present invention in an apparatus wherein pipe sections 12 are hand fed or otherwise deposited on the transversely directed conveyor 16 which then passes the pipe ends through the heater 18 and multiple station belling unit 20.

There now follows a description of each of the several components hereinabove referred to and an explanation of how their operations are coordinated and synchronized in order to constitute an integrated pipe-belling line:

i. The Pipe-Dumping V-trough

The V-trough 10 is shown in FIGS. 1, 2 and 3. It is disposed at the exit opening 14a and in alignment therewith of the pipe cutter 14. Such a cutter forms no part of the present invention and is well understood in its construction by those in the plastic pipe extending and handling art. The cutter 14 receives continuously extruded plastic pipe 12a from the extruder (not shown), passes such pipe 12a through it and out of the orifice 14a and cuts the continuously extruded plastic pipe into predetermined lengths 12. As such pipe lengths 12 are pushed out of the orifice 14a, they enter the V-trough 10 and continually advance to the left, as shown in FIG. 2, so long as a pushing force is applied either directly by the cutter 14 or indirectly by a second pipe following sequentially a prior pipe which has already been completely discharged from the orifice 14a. Depending upon the length of the pipe which is to be belled, a micro-switch 22 is disposed in the V-trough at a preselected point 24. This point 24 should be located with reference to the entrance 10a of the V-trough at a distance of approximately the length of the pipe being handled.

As may be seen in FIG. 2a and the left side of FIG. 3, the V-trough is comprised of a stationary left side plate 26 and a movable right side angled plate 28. The movable plate 28 is pivotable about a shaft or axle 30 which may extend substantially the length of the V-trough and is supported independently by framing 32. The plate 28 swings through the angle X between a position where it abuts the lowermost edge 26a of the stationary plate 26 and a substantially vertical position shown in dotted lines. The swinging of the movable plate 28 between its two positions is accomplished by means of a pneumatic cylinder 34 located in the apparatus framing 32 and which moves a pneumatic ram 36 and crank arm 37. The arm 37 extends integrally upward from shaft 30 to which the plate 28 is also fixedly secured. The shaft 30 rotates on the axle 30. The cylinder 34 is actuated when the switch 22 is triggered, to pivot the plate 28 to its substantially vertical position for a brief moment, thereby permitting a pipe 12 which, at this instant, is advancing in the V-trough formed by the two plates 26 and 28, to drop down by gravity, or in other words, to be "dumped" in a downward direction transverse to the direction in which the pipe had been advancing in the V-trough 10. Although the switch 22 is shown to be located at the far left of the V-trough 10 in FIG. 2, it will be understood that if smaller cut pipe sections are to be belled, this switching mechanism 22 would be moved to the right to any point in the V-trough which is located such distance from the entrance 10a to the V-trough as is substantially equal to the length of the pipe to be belled. Thus, for a pipe of half the length of the V-trough shown in FIG. 2, the switch 22 might be located at the point 24'.

When the movable plate 28 reaches its vertical position, an arm 38 which is also secured to shaft 30 in proper angular position contacts a switch 39 which causes cylinder 34 to return to its normal position thereby again forming the closed V-trough.

When the switch 22 is triggered to actuate the dump cylinder, it simultaneously sends a signal to the belling unit 20 to actuate a complete machine cycle in the manner hereinafter to be described. If this actuation of the machine cycle should be too infrequent or too irregular due to fluctuations in the extrusion speed of the actuating pipe, then the actuating signal from switch 22 may be cancelled by a by-pass switch and replaced by a timed signal of adjustable and precisely repeatable interval.

ii. The Transversely Directed Conveyor

This conveyor 16 is also shown in FIGS. 1, 2 and 3, but also partially in some detail in FIG. 5. The conveyor 16 is actually comprised of two endless conveyors, the first being a series of endless belts 40, each of which is disposed at an angle with respect to the direction in which the pipe 12 has been advancing in the V-trough 10 and a second series of endless conveyors 42, each of which is perpendicular to the V-trough and runs partially concurrently with one of the endless belts 40. As may be best seen from FIG. 3, the endless belt 40 moves in the direction of the arrow 40'' with its upper surface 40' beginning just below the movable plate 28 and the V-trough 10 so that such upper surface 40' may receive any pipe dumped from the V-trough 10 as the plate 28 is swung to its vertical position by the pneumatic cylinder 34. When the thus-dumped pipe 12 lands on the left upper surface 40' of the endless belt 40, it will be carried by the latter in the direction toward the heating and belling units 18 and 20, and, in addition, toward the stop or positioning plate 41. The stop plate 41 is so positioned with respect to the heater 18 and beller unit so that the end of each pipe to be belled is properly disposed in the heater 18 and beller unit 20. The endless belts 40 are continuously rotated by the motor 44 through the gearing 46 and 50 and the chain 48 so they not only serve to move each pipe 12 transversely to the V-trough 10 and toward the stop or positioning plate 41, but they also continuously rotate in counterclock direction each pipe so long as the pipe contacts the upper surfaces 40' of the belts 40.

Each of the second endless conveyors 42 overlaps the endless belts by approximately one-half of the upper surfaces 40' of the endless belt. However, the endless conveyor 42 does not move continuously but instead only by predetermined increments at predetermined intervals.

The endless conveyor 42 has mounted about its outer periphery 42' a series of outwardly facing carrier receptacles 52, each by means of a strut 54 secured to the periphery 42'. Each of these carrier receptacles 52 has a transverse V-shape at 56 to accommodate a pipe 12 after the pipe leaves the end of the endless belt 40 at 58. Each carrier 52 is also provided with an outwardly projecting stake 60 which serves as a separator for the pipes 12 so they are deposited by the endless belt conveyor 40 at the point 62 where the course of the second endless conveyor 42 begins to run concurrently with the course of the endless belt conveyor 40. As may be seen from FIGS. 3 and 5, the respective courses of the endless conveyors 40 and 42 are not concurrent for their full extents, but only between the points 62 to 58. Because of this concurrence, however, the pipes 12 are continuously rotated while their ends to be belled are disposed in the heater unit 18. Beyond point 58, the endless conveyor 42 continues to move the pipes 12 incrementally, but not rotatingly, at predetermined intervals past the belling stations designed generally at 20 on FIG. 3. Upon passing the last of said belling stations, the endless conveyor 42 returns downwardly and back to its opposite end. The incremental movement of the endless conveyor 42 is accomplished by connecting a sprocket 64 by a chain 66 to a sprocket 68 on a shaft 70, which, in turn, is coupled by a universal joint 51 to the main drive shaft 73 of the belling unit 20 hereinafter to be described.

iii. The Heater Unit

As previously stated in reference to FIG. 2, the heater unit 18 is located beside the belling unit 20 and is disposed in such a manner that the ends 12b of the pipes 12 (which pipes are picked up at 62 by the endless conveyor 42 (FIG. 3) and are moved by predetermined increments at predetermined intervals), pass under the electrical or other heating element 72, and between such heating element 72 and a reflector 74 disposed below the heater element 72. Both the heater element 72 and the reflector may be moved toward or away from each other by turning the wheel 72 (FIGS. 3 and 4) which in turn rotates a threaded shaft 78 on which both the heater element 72 and the reflector 74 are mounted. By providing for such movement, the heater may be adjusted to increase or decrease the quantum of heat which is actually applied to pipe ends 12b passing thereunder, as well as to permit the passage through the heating area 18a of pipe ends of greater or lesser size.

iv. The Belling Unit Per Se

The construction and operation of the belling unit are best illustrated in FIGS. 3–9 inclusive. In the embodiment of the invention illustrated in these figures of the drawings, the belling unit includes four stations 80, 82, 84 and 86. For a specific short time period during each of the predetermined intervals, the endless carrier 42 temporarily disposes an end 12b of a pipe 12 in each of the four said belling stations 80, 82, 84, 86. During this short time period, when a pipe end 12b is temporarily disposed in station 80, a pair of transverse plates 88 and 90, each of which plates has secured on its ends and facing the other plate, a semi-circular clamp 92, are moved toward each other to bring the opposed clamps 92 together to define a cylindrical surface. This movement is accomplished by having each of the plates 90 and 92 connected by a swivelling joint 94 to one of two reciprocating arms 96–97 which is in turn connected to a rotating disc 98 by a further swivelling connection 100 located eccentrically with respect to the axis of the circular disc 98. Extending oppositely from the opposed faces of the plates 88 and 90 are a pair of cylindrical guide members 102, each of which is closely slidable through a block 104 which is attached to a back plate 106 held fixedly by the housing 109 of the heater-beller units. With this arrangement, upon the rotation of each circular disc 98 to cause reciprocation of the arm 96 connected eccentrically to the disc 98, each plate 88, 90 will be moved between a first position in which the opposed semi-circular clamps 92 are spaced apart from each other, to a second position where the two semi-circular clamps 92 are brought together to define a cylindrical passage.

By properly dimensioning the thus-brought together semi-circular surfaces 93 (FIG. 6B), the latter will define a cylindrical passage having the diameter of the outside of the cylindrical wall of the pipe 12b.

The reciprocating arm 97 may be fixed in its longitudinal dimension and formed of either a tube or a solid member with threaded ends to receive the threaded elements 94a and 100a extending from the connections 94,100 100 respectively. Its stroke may be such that its clamp 92, when it reaches its zenith, aligns the clamp's center axis, and hence the axis of the pipe 12 which the clamp surrounds, precisely with the axis of the belling mandrel 110 for concentric entry by the latter into the pipe 12. The crank arm 96, however, as may be seen in FIGS. 3A and 3B, is of a telescoping spring-biased type with an extendable length which, if there should be no obstruction, would permit the clamp 92 extending downwardly from the plate 88 to travel slightly further than the point at which the axes of the two clamps would coincide. Thus when the two clamps are brought together by their respective crank arms 96,97 97, the portion of the pipe 12 encompassed by the clamps is positively squeezed between them, even if the pipe diameter should be somewhat irregular. As heretofore explained the clamp friction thus achieved serves to maintain the pipe 12 in its position against any longitudinal force acting against it by the belling mandnrel when the latter is inserted in the softened pipe end, and holding of this predetermined position without permitting the pipe end to creep is necessary to achieve and maintain the prescribed belling depth.

While it is contemplated that the clamp 92 may define a single cylindrical surface of the outside diameter of the pipe 12 before insertion into its end 12b of the belling mandrel 110, there could also be provided, as illustrated in FIG. 6B a pair of bell shaping clamp halves 92a, which, when brought together, define the outer surface of the pipe end 12b after the mandrel 110 has been inserted into it.

To accomplish the actual belling of the pipe end there is moved into the first belling station 80 a block 108 from the end of which projects a mandrel 110. The mandrel 110 is comprised of a first section 110a which is substantially cylindrical and of an outside diameter equal to the inside diameter of the end of the pipe 12b after it is belled; and a second smaller coaxial section 110b of reduced diameter which is equal to the inside diameter of the unbelled portion of the pipe. A bevelled face 112 extends between the two sections where they come together. When the opposed semicircular clamps 92 are brought together in the first belling station 80, the block 108, which immediately prior thereto is disposed in a position 114 (FIG. 9) directly to the rear of belling station 80, is moved in the direction of the arrow 116 into its station 80 position. When this movement occurs, the mandrel 110 is forced into the pipe end 12b disposed in belling station 80 to expand that portion of the pipe end 12b into which the section 110a of the mandrel 110 extends, radially outwards. Such expansion may readily be accomplished because the pipe end 12b in station 80 has been softened by exposure to the heater 18, having just been moved out of the heater station 118, which is the last of several positions 120, 122, and 124, where the pipe ends rotatingly pass between the heating element 72 and the reflector 74 in the heating unit 18.

The movement of the block 108 from its position 114 to belling station 80 is accomplished by movement of a rod 128 which is reciprocated in a bearing 130 by the crank 129 controlled by the cam 131 in the arrangement shown schematically in FIG. 12E. Disposed on one end of the rod 128 is an engaging head 132, which slidably fits in a transverse slot 136 in the rear of the block 108. The underside of each block 108 is further slotted at 138 (FIG. 8) to receive one of the ribs 142 which project outwardly and upwardly from the endless carrier 140. One of such ribs 142 will be disposed in belling station 80 at the time the block 108 is moved by the rod 128 from position 114 into belling station 80, and the slotting 138 thus permits the block 108 to be moved transversely to the endless carrier 140 and to engage one of the ribs 142. The endless carrier 140 is synchronized in its movement with the endless conveyor 42 to move the same predetermined distance at the same predetermined intervals. Such an interval may be on the order of eight seconds. It may be seen, then, from FIGS. 8 and 9 that when the predetermined interval terminates, by virtue of engagement of the rib 142 in the slotting 138 in the block 108, the latter will be moved the distance A by the endless carrier 140 from belling station 80 to station 82. After a further such interval, such block 108 will be moved the distance B from belling station 82 to station 84; and finally the distance C, from belling station 84 to station 86. Each of the distances A, B, and C is equal. As each block 108 is thus moved by the carrier 140, the pipe 12, the end 12b of which has a mandrel 110 inserted in it, is moved simultaneously and correspondingly by the endless conveyor 42.

As the block 108 slides in the direction of the arrow 145 from belling station 84 to station 86, the head 146 of a second rod 148 is received in the block slotting 136, thereby enabling the block 108 to engage the head 146 of the rod 148. This rod 148 operates in a manner similar to the rod 128 by another cam operated crank 150. Thus, when the rod 148 is retracted in the direction of the arrow 152, the engaged block 108 is slid off its rib 142 on the endless carrier 140, so that the block no longer continues to move with the endless carrier. Instead, the block 108 which had been in station 86 is pulled by the rod in the direction of the arrow 152 until it is first disposed in position 154.

It should be pointed out at this juncture that, as may be seen from FIGS. 4 and 6, a notched stripping plate 106a is removably secured against the back-plate 106 at least partially closed to encircle the mandrel 110 when it arrives in the belling station 86 still inserted in a pipe end 112b. Lateral arrival is permitted because of the configuration of the notch 107 and its disposition to receive the mandrel as it is moved from belling station 84 to station 86. Because the diameter of the notch 107 is less than the outside diameter of the belled pipe end 112b, it will be appreciated that when the block 108, with its mandrel in station 86, is moved in the direction of the arrow 152 until it is disposed in position 154, the stripping plate 106a will prevent the pipe 112 from following the mandrel 110 in the direction of the arrow 152. Thereby, the pipe 112 is effectively stripped from the mandrel 110 so that the latter may be moved further by the endless carrier 42 for dumping from the belling unit. From the position 154, the block 108 is pushed transversely by a pair of rods 155 operated by a cam controlled crank 157, as shown in FIG. 12F, first into an intermediate position 156, thereby disengaging the rod head 146 from the slot 136; and then further back to its original position 114 for return to belling station 80. As the block 108 is pushed into position 114, there is awaiting it the head 132 of the rod 128, and this head 132 is received in the block slotting 136 so that the block may be moved back into station 80 by the rod 128. The movement of the block 108 out of belling station 86 first to position 154, then to position 156, next to position 114, and finally back into belling station 80 is all accomplished during the predetermined interval, which, as hereinabove stated, may be on the order of eight seconds. The block movements are illustrated ideogrammatically in FIGS. 16A-B.

During the portion of the interval that the semicircular clamps are brought together, a damper plate 162 (FIGS. 4, 6, and 6A) is opened to permit air from each of an upper and a lower blower 158, 160, respectively, to enter the passage 161, defined by the walls 106, 163 (FIG. 6) and 165, 167 (FIG. 6A) and to pass around the plugged pipe ends 12b in belling stations 82 and 84 to cool them. However, because there is no baffling between stations 80 and 82 and stations 84 and 86, some cooling air arriving at stations 82 and 84 will also reach the pipe ends 12b in stations 80 and 86.

Since it is not desirable to have any of the cooling air pass over a pipe end 12b as it arrives in the belling station 80 and before it has been plugged with a mandrel 110, it is a feature of the present invention to shut off substantially all flow of cooling air from the blowers 158, 160 to all four stations 80, 82, 84, 86 during that portion of the interval as is consumed by the moving of pipe and 12b from the last heater station 118 down to belling station 80 and plugging it with a mandrel 110. This shutting off of the air flow to the plugged pipe end 12b is accomplished by closing the damper plate 162 in synchronism with the movement of the plates 88, 90 apart from each other. Although FIGS. 6 and 6A illustrate the damper mechanism arrangement only for the lower blower 160, it should be understood that a similar damper mechanism (not shown) is provided oppositely above the belling stations 80, 82, 84, 86 to shut off the air from the blower 158.

The damper system is constructed as follows: Within the four walls 106, 163, 165 and 167 which define the passage 161 of rectangular cross section, is slidably disposed a damper assembly 162 comprised of a pair of corner posts 171, secured at their upper ends to a frame 173, itself attached to plate 90 to be movable therewith, and from three sides of which frame 173 extend downwardly walls 175, 177 and 179. The damper plate 162 is trunnioned at the lower ends of posts 171 to be pivotable about a rod 181. Because the assembly 162 is attached to the plate 90, it will move upwardly and downwardly from the latter within the passage 161 defined by the four walls 106, 163, 165 and 167. A cam 162d projects inwardly along one side of said passage in the manner shown in FIG. 6A.

The damper plate 162 is provided with a striker tab 162a having secured thereto an over-center spring 162b attached to wall 163. When tab 162a is struck by the end of shaft 164 as it is reciprocated to the left and through orifice 169 in wall 106, the damper plate 162 is pivoted to its open position shown in dotted lines in FIG. 6A and is held there by the over-center spring 162b. Reciprocation of shaft 164 is accomplished by connecting it to move with rod 128 so that damper opening coincides with full insertion of mandrel 110. The shaft 164 may pass through an outer sleeve 166, secured perpendicularly at 166a to the wall 106. Subsequently, the shaft 164 is shifted to the right and out of orifice 169. When plate 90 is moved to its lowermost position by arm 96, the entire damper assembly moves with it, the open damper 162 striking the curved end of stationary cam 162d with its edge 162c, thus closing the damper first partially as the downward travel progresses, then fully as spring 162b goes over the center. When plate 90 is again raised to close the clamps, the damper still remains closed. However, tab 162a is once again poised in the path of shaft 164, to be struck open during the next forward movement of shaft 164.

As may be best seen from FIGS. 4 and 6, the discs 98 are driven in synchronism by chain 172 which extends about a sprocket 170 on a shaft 174 to which discs 98 is mounted, and additionally around a sprocket 176 connected by a further chain 176a to a sprocket 168 in the main drive system hereinafter to be described. The chain 172 additionally passes around idlers 178, 180, 182. The rotation of the sprocket 168 is synchronized by a cam arrangement shown in FIG. 12c and hereinafter to be described.

v. The Synchronized Drive System

Figure 17:
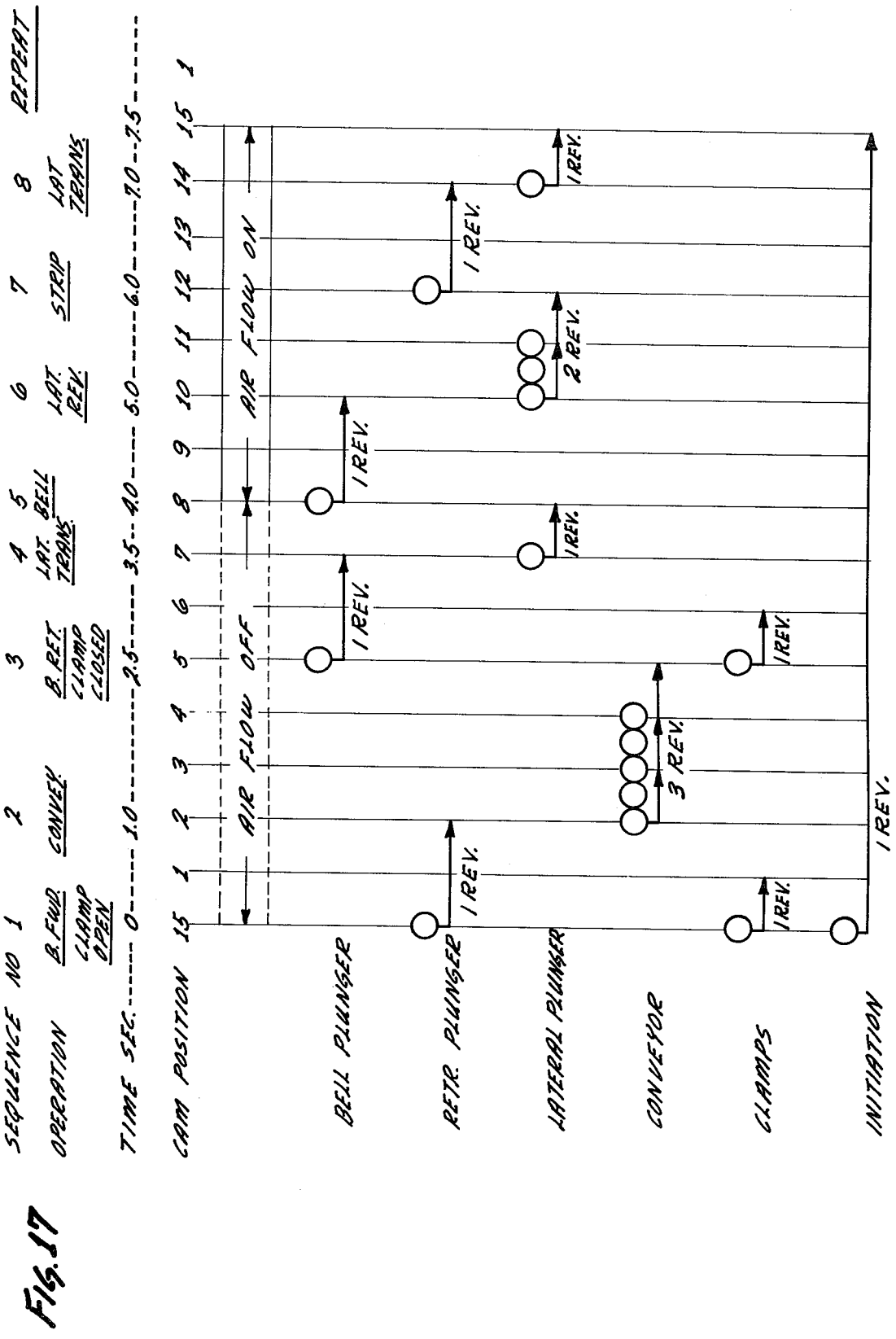
FIG. 17 is a chart showing the synchronism of the various moving components of the apparatus.

This system is illustrated and partially described in FIGS. 10, 11, 12A through 12F, 16A–G and 17. As may be seen from FIG. 2, the main drive system is located in the housing to the right of the heating unit 18 and the multiple belling unit 20. This main drive system is shown in more detail in FIG. 10. The power source for the main drive system may be a one-half horsepower constant or variable speed motor 200 which through pulley 202, belt 204 and pulley 206 rotates shaft 208 at a fraction of the rpm at which the motor 200 is being operated. The shaft 208 is interrupted by a slip clutch 209 to prevent damage through overload. A shaft extension 208a extends from slip clutch 209 to a gear 210. By chain 212 and gear 214 rotation of gear 210 is imparted to shaft 216 at a still slower speed. Through bevel gears 218 and 220 rotation of shaft 116 causes shaft 222 to rotate. Clutch 246, controlled by cam 247 permits gear 246a to rotate to a limited extent shown in FIG. 12F, and is connected by a chain (not shown) to gear 246b (FIG. 7) to operate the crank 157. Bevel gears 228 and 230 and shaft 232 are caused to rotate.

When shaft 236 is rotated, shaft 222 through cam 240 and clutch 238 operates gearing 240a connected by a chain (not shown) to rotate the gear 244 (FIG. 7) which operates rod 128. Shaft extension 222a operates clutch 239 as permitted by cam 241, in the manner disclosed in FIG. 12C, to drive gear 239a connected by a chain (not shown) to gear 239b (FIG. 7) and thereby rotates the crank 150 which reciprocates the rod 148.

As may be seen from FIG. 12A, the main drive shaft 216 is provided with a worm gear 235 which meshes with the gear 224 to turn therewith. A slip disc 233 is attached to one side of the gear 224. Rotation of the slip disc 233 as well as the shaft 236 is prevented, however, by the solenoid clutch 234, through which shaft 236 extends, until the clutch 234 is electrically actuated by the switch 22 when triggered by the dropping of the movable plate 28 of the V-trough 10 (FIG. 3), or by independent interval timing means. When such triggering occurs, the solenoid 270 will be momentarily energized to draw the rod 272 upwardly pulling with it the arm 274 over the detent 276. Thereby shafts 236 and 232 and all cams thereon are rotated one revolution, thus initiating the cycling of the entire system and effecting the required synchronism of the entire main drive and cam system.

The rotation of shaft 216 through clutch 248, gear 247, chain 250, gears 252 and 256, chain 258 and gear 260, effects the rotation of shaft 72 and its extension 70, shown on the lower right hand side of FIG. 3, thereby to drive the endless conveyors 42 and 140 via universal joint 51, sprockets 68, chains 66 and sprockets 64 hereinabove described in synchronism with the other moving members of the apparatus.

The clutching by clutch 248 of rotating shaft 216, as permitted by cam 248a is shown in FIG. 12d. Clutch 249, controlled by cam 251, rotates sprocket 168 in the manner shown in FIG. 12c, to drive the chain system comprising chains 176a and 172, shown in FIG. 4.

The single or multiple revolution solenoid clutch 234 (FIG. 12a) which may be of SA Series type manufactured by the PSI Division of Warner Electric Brake and Clutch Company, located at Pitman, N.J., while each of the other clutches 238, 239, 246, 248 and 249 may be mechanically actuated single or multiple revolution wrap spring clutches of the PSI series of the same manufacturer. However, as one skilled in the art will readily appreciate, solenoid clutch brakes (Type CB) may be substituted for the mechanical came to accomplish the cycling functions, substituting a multiple central cam for limit switches, but employing the same program of sequencing.

FIG. 13 discloses a cam disc of the type which may be preferably utilized to effect the timing of the various shaft and gear movements hereinabove described. Each of the cam discs is provided with a certain number of orifices 277 spaced at substantially equal radial and circumscribing displacements about the disc axis. Although the precise number of orifices may be varied by those skilled in the art to effect the same or similar results, in the embodiment of the invention illustrated in FIG. 13, 15 orifices 277 are provided. This number corresponds to the total number of full or partial incremental steps to be accomplished by the synchronous mechanism. Since cam shafts 232 and 236 are driven via worm gears 235 and 224 from main drive shaft 216 at the speed reduction ratio of 15:1, this results in shafts 232 and 236 making exactly one full revolution for every 15 revolutions of drive shaft 216. With a 2:1 speed reduction at gears 218 and 220, for every 7½ revolutions of shaft 222 and its extension 222a, shafts 232 and 236 will similarly make one revolution. Shafts 216 and 222 rotate continuously, but the clutches 238, 239, 246, 248 and 249 mounted thereon are inactive, i.e. their output gears 240a, 239a, 246a, 247 and 168 respectively, remain at rotational standstill, thus holding their respective driven loads at a precise fixed position, until commanded in a sequentially programmed order to turn at the rate of shaft 216 or shaft 222 for either one or more full revolutions to accomplish the desired full or partial reciprocation or rotational advancement of their respective output aggregates. The command to so engage and then stop again is imparted to the clutches by their respective cams 240, 241, 247, 248a and 251. It occurs when the cam rotates and an advancing cam pin 280 contacts the pivotable cam dog 400 and lifts it momentarily as it passes under it at point 402. This moves cam dog surface 403 out of contact with an opposing detent surface on the periphery of the clutch, thereby engaging the clutch, so that its output gear is now rotating at the same speed as the clutch input shaft 216 or 222. The relative motion between cam pins 280 and the clutches is such that cam pin 280 will have passed under point 402 well before the clutch has completed one revolution. Consequently, cam dog surface 403 is back in contact with the clutch periphery, biased toward it by spring 401, before the opposing detent surface has reached it. When it does, after a turn of 360°, it contacts the cam dog surface at the same rotational position, thus disengaging the clutch and stopping all rotation of its output member. All five clutches 238, 239, 246, 248 and 249 are operated in this manner, the only difference being the timing with respect to one another and the number of full revolutions allowed. For reasons of speed and torque, as well as cranking distance, the sequencing may require either one, two or more revolutions from one or more of the several clutches. For one revolution, one pin 280 on a defined position of the cams is used. For two uninterrupted revolutions it requires two pins in adjacent 1/15 radical positions with a third centered between them to provide cam dwell and thus prevent harsh stop-go action. For three revolutions, three pins and two intermediate dwell pins (five total) are used.

As can be seen, since cam shafts 216 and 236, once actuated to rotate on command to solenoid clutch 234, make one full revolution to actuate the five load clutches 238, 239, 246, 248 and 249 at the predetermined intervals, all these load clutches will perform and complete their functions within fifteen revolutions of drive shaft 216. Thereupon, shafts 216 and 222 will continue to rotate, while the cam shafts and the cams mounted thereon will stop when the last fifteenth cycle is completed, and no further action will occur until solenoid 234 is again actuated to rotate the cam shafts.

The heater 18 and beller unit 20, as well as the entire main drive transmission system shown in FIG. 10, are mounted on a platform 300. This platform, together with side housing 302 attached thereto by the bracket 304, is supported at each of its corners by a threaded shaft 306 which fits telescopically in a sleeve 308 extending between and supported by underframing plates 310 and 312 held in spaced relationship to each other by U-shaped members 314. A sprocket 320 has its internal bore threaded to match the threaded shaft 306, and is rotatable with respect to shaft 306. A thrust bearing 316 bears the weight of the assembly, which is transferred from platform 300 through shafts 306 to sprockets 320. All sprockets 320 are connected to rotate together by a chain 322. Independent reversible motor means with a two-way switch (not shown) may be provided to drive the chain 322 through a further pulley 324. Thus, when the motor (not shown) is switched on and the pulley 324 is rotated in one direction, each of the pulleys 320 will be driven in that direction to cause the axles 306 to rise up within sprockets 306 and thus within the sleeve 308. By reversing the motor direction the axles may be lowered. Thereby, the entire platform 300 with the heater 18, beller 20 and the transmission system may be raised or lowered at will in relation to the fixed level of the endless conveyors 40 and 42.

vi. Operation of the Apparatus

In operation, the apparatus accomplishes rapid belling at pipe ends to the configuration shown in FIG. 14 so that the unbelled spigot end 12a of another pipe may be inserted in the belled end 12b of the pipe 12 as shown in FIG. 15. A pipe 12 is initially received in the V-trough 10 from the saw unit 14. When this pipe 12 is advanced down the V-trough to where it trips a dumping switch 22, the movable side plate 28 drops away from the stationary side plate 26 to dump the pipe onto the endless belt conveyor 40 and, at the same time, triggers the switch 39 to initiate a complete cycle of the heating and belling apparatus.

The pipe 12 is first rotatingly conveyed by the endless belt conveyor 40 until it rests against the first stake 60 projecting upwardly from the endless carrier 42. During this period of conveyance, the pipe is moved transversely until its one end 12a abuts the positioning plate 41. With one end 12a of each pipe abutting the positioning plate 41, the other end 12b of the pipe will be properly disposed to pass through the heater 18 and the beller unit 20 in appropriate processing positions. As each pipe 12 is picked up between stakes 60 of the endless conveyors 42, the pipe is advanced periodically through the heater 18 while being continuously rotated by the belt 40' of the endless belt conveyor 40. When the pipe reaches the last heater station 118, it leaves the belt 40' of the endless conveyor 40 and drops down into a V-shaped receptacle 52 on the endless conveyors 42.

The first carrier receptacle 52 is indexed so as to dispose the pipe end 12b in the first belling station 80 in the belling unit. Upon the arrival of the pipe end in the station 80, the semi-circular clamps 92 are brought together about the pipe 12 and, in the next automatic sequence, a mandrel 110 is pushed into the pipe end 12b to expand the same to conform with the outer cylindrical surface formed by the mandrel 110. The upper and lower dampers 162 are thereupon opened to permit cooling air to flow down over stations 82 and 84 and laterally onto stations 80 and 86 until the plates 88 and 90 are reciprocated apart from each other, thereby effecting a re-closing of the dampers 162. As the plates 88 and 90 are thus moved away from each other, the carrier 42 is indexed to move by one increment so that the pipe end 12b in station 80 is moved to station 82, while the next pipe in heater station 118 is dropped down into station 80. This cycling is further repeated until the pipe end 12b is moved from station 82 to station 4 and from there, to station 86 and is finally dumped off the endless carrier 42 as the stake 60 thereof swings down and under the gear 64.

Thus, it may be seen that the embodiment of the invention herein disclosed five pipe ends are simultaneously being subjected to heat provided by the heater 18 for additional periods of time, and four pipe ends are simultaneously being subjected to various steps in the belling process, starting with the initial step of inserting the mandrel into the pipe end to expand the same, continuing with cooling the pipe ends into each of which a mandrel has been inserted with the mandrel still therein; and concluding with the step of stripping the mandrel from the belled end cooled pipe and prior to its discharge from the apparatus. The apparatus thus eliminates the necessary time delay which is inherent in attempting to take pipe ends one at a time and heat it, bell it, cool it and strip it, as has been the case with prior art apparatus.

In addition, because of the feature whereby the platform on which the heater, beller, and its transmission apparatus is mounted may be raised or lowered, it is possible for the apparatus to be readily reset to accommodate different sizes of pipe to be belled. Of course, where a different pipe size is to be belled from that for which the machine has been once set up, it is necessary to change the diameters of both the mandrel 110 as well as the inside diameters of the semi-circular clamps 92, and the dimensions of the stripper plates. Synchronism of all movements of the apparatus is accomplished through the clutch cam transmission system herein disclosed in the drawings and discussed above.

We claim:
1. High speed plastic pipe belling apparatus, said apparatus comprising:
A. Endless conveyor means, one end of said conveyor means being disposed to receive lengths of pipe sequentially and transversely deposited on said end of said conveyor and to convey said lengths of pipe periodically a predetermined distance in a first substantially horizontal direction, said conveyor means including:
i. a series of receptacles about said conveyor means, each receptacle serving to receive and retain a pipe at a discrete location on said endless conveyor means as it moves periodically in said first direction;
ii. a positioning plate at one edge of the endless conveyor means;
iii. continuously moving endless belt means, the last said means extending concurrently with, for at least a part of the course of said endless conveyor means, and the upper surface of said endless belt means being in contact with the lowermost portion of each pipe disposed in each of said receptacles, said endless belt means serving continuously to rotate said pipes, the axis of said belt means being slightly canted with respect to the axis of said conveyor means thereby to cause each pipe to be moved vertically transversely to the first direction toward the positioning plate until one end of said pipe abuts said stop plate; said stop plate being so disposed in relation to each length of pipe as to project the opposite end of each said pipe beyond the edge of the conveyor opposite that adjacent the stop plate, for heating and belling;
B. A first drive shaft;
C. First chain and sprocket means, the last said means being engaged to said first drive shaft and adapted to move said endless conveyor means in predetermined increments in said first direction in accordance with the amount of rotation imparted to said first drive shaft;
D. heater means, said heater being disposed along a portion of the opposite edge of the endless conveyor means from that adjacent the stop means, and about the projecting end of each rotating pipe while said pipe is (i) disposed in a receptacle on said endless conveyor means, (ii) being rotated by said endless belt means and (iii) positioned with its distal end abutting said stop plate;
E. multiple station belling means, said belling means extending in said first direction from the end of said heater means; and comprising:
 i. a first station including:
  a. a pair of clamps having a pair of mating jaws, which jaws in their closed position define a cylindrical opening coaxial with the end of a pipe when it is disposed in said first station after having been moved past said heater means, and said opening being of a diameter equal to the outside diamter of the pipe, said clamps being reciprocable between a first position in which said opening is so defined and said clamps surround the pipe inwardly of the heat-softened end to be belled, and a second position in which said jaws are sufficiently separated from each other to permit a pipe to be moved in said first direction in and out of said first belling station; and
  b. means to effect such reciprocation of said jaws at predetermined intervals;
 ii. at least one other station adjacent said parallel to said first station, said at least one other station including an air cooling area in which a belled pipe end may be retained for a predetermined cooling period;
 iii. air blower means directing cooling air into said area;
 iv. a plurality of blocks from each of which extends in said second direction a bevelledended cylindrical plug, each of said blocks being movable:
  a. in said first direction at said predetermined increments from said first station to the last of said other stations;
  b. from said last station in said first direction a predetermined distance to a position from which the block may be further moved to pass around the other blocks while the latter are disposed to their second and other respective stations;
  c. from said position around the other blocks in a fifth direction to another position in alignment with said first station for return movement therewith; and d. from the last said position, in said fourth direction back into the first station;

v. the said plug in each block, upon the last said movement of the block back into the first station, being inserted in the pipe end then disposed in the said first station and outwardly of said cylindrical opening, to expand said pipe end to conform generally to this configuration of the outer surface of the block plug; and said this inserted plug being retained in the pipe end as its block moves from said first station progressively to the last of said other stations, whereupon, when the block is moved in the first direction, the plug is withdrawn from the pipe end, and the thus-belled pipe may thereafter be discharged from the apparatus by said endless conveyor means; and F. Synchronized power means, said means, when triggered to commence operation, initiating a cycle which includes:

i. providing at predetermined intervals a predetermined angular rotation of said first drive shaft to move said endless conveyor a predetermined increment in said first direction;

ii. reciprocating the jaws of the pair of clamps to and apart from each other at each such predetermined interval;

iii. moving the block in the said last station in the first direction to its position from which it may be further moved to pass around the other blocks, thereby withdrawing the plug projecting from the said thus-moved block from the end of the pipe in which it has been inserted and retained, so that such pipe, as thus belled, will be discharged by the apparatus upon further incremental movement of the endless conveyor means;

iv. moving each other block in a station preceding said last station to the next station thereby vacating the first station and disposing a block in each succeeding station including said last station;

v. moving the block in its position from which it may be further moved to pass around the other blocks to its position in alignment with the first station, and, upon vacation of the first station, further in the first direction into the said vacated first station, whereupon the cylindrical plug projecting from the last moved block is forced into the pipe end which has just moved into the said first station by the endless conveyor said predetermined increment from the end of the heater area;

whereby a series of pipe ends may be sequentially and rapidly heated, belled, cooled to set the belled end, and discharged from the apparatus.

2. High speed plastic pipe belling apparatus, said apparatus comprising:

A. V-trough means to receive and permit a length of plastic pipe to be advanced therein in a first direction, said trough means including:

i. a movable element, said element serving in part to contain said pipe as it is being advanced, and when said element is moved, to dump said pipe downwardly in a second direction transverse to said first direction; and ii. electrical switching means, the last said means being triggered when a length of pipe reaches a predetermined disposition in said trough means;

B. continuously moving endless belt conveyor means, the last said means extending in a third substantially horizontal direction at least partially transverse to the first direction and having one end below the movable element to receive each pipe as it is dumped from the trough conveyor means and to convey it both further in the first direction as well as transversely thereto, C. second endless conveyor means, said conveyor means being disposed partially concurrently with the endless belt conveyor means and directed to convey pipes being placed therein by the last said means in said third direction, said second conveyor means including a series of receptacles about said second conveyor means, each receptacle serving to receive and retain a pipe at a fixed location on said second endless conveyor means as it moves in said third direction;

D. a stop plate at the edge of the second endless conveyor means closest to the leading ends of the lengths of pipe being dumped, said stop plate being so disposed in relation to each length of pipe as to project the opposite end of each said pipe in a fourth direction opposite the first direction beyond the edges of the two endless conveyors for heating and belling; said endless belt conveyor means moving each pipe in said first direction until its leading end abuts said stop plate; said endless belt conveyor means continuously rotating the pipes dumped thereon and conveyed thereby;

E. A first drive shaft;

F. First chain and sprocket means, the last said means being engaged to said first drive shaft and adapted to move said movable element to dump a length of pipe onto said endless belt conveyor means, to drive continuously said endless belt conveyor means, and further to move said second endless conveyor means in predetermined increments in said third direction in accordance with the amount of rotation imparted to said first drive shaft;

G. heater means, said heater being disposed along a portion of the edges of the two said endless conveyor means which are distal from the stop means, and about the projecting end of each rotating pipe while said pipe is (i) disposed in a receptacle on said second endless conveyor means, (ii) being rotated by said endless belt means and (iii) positioned with its distal end abutting said stop plate;

H. multiple station belling means, said belling means extending in said third direction from the end of said heater means; and comprising:

i. a first station including:

a. a pair of clamps having a pair of mating jaws, which jaws in thier closed position define a cylindrical opening coaxial with the end of a pipe when it is disposed in said first station after having been moved past said heater means, and said opening being of a diameter equal to the outside diameter of the pipe, said clamps being reciprocable between a first position in which said opening is so defined and surround the pipe inwardly of the heat-softened end to be belled, and a second position in which said jaws are sufficiently separated from each other to permit a pipe to be moved in said third direction in and out of said first belling station; and b. means to effect such reciprocation of said jaws at predetermined intervals;

ii. at least one other adjacent and parallel to said first station, said at least one other station including an air cooling area in which a belled pipe end may be retained for a predetermined cooling period;

iii. air blower means directing cooling air into said area;

iv. a plurality of blocks from each of which extends in said first direction a bevelled-ended cylindrical plug, each of said blocks being movable:

a. in said third direction at predetermined increments from said first station to the last of said other stations;

b. from said last station in said fourth direction a predetermined distance to a position from which the block may be further moved to pass around the other blocks while the latter are disposed in their second and other respective stations;

c. from the last said position around the other blocks in a fifth direction opposite said third direction to a further position in alignment with said first station for return movement therewith; and d. from said further position, in said first direction back into the first station;

v. the said plug in each block, upon the last said movement of the block back into the first station, being inserted in the pipe and then disposed in the said first station and outwardly of said cylindrical opening, to expand said pipe end to conform generally to the configuration of the outer surface of the block plug; and said thus inserted plug being retained in the pipe end as its block moves from said first station progressively to the last of said other stations, whereupon, when the block is moved in the fourth direction, the plug is withdrawn from the pipe end, and the thus-belled pipe may thereafter be discharged from the apparatus by said endless conveyor means; and G. Synchronized power means, said means, when said electrical switching means is triggered, initiating a cycle which includes:

i. providing at predetermined intervals a predetermined angular rotation of said first drive shaft to move said second endless conveyor a predetermined increment in said third direction;

ii. reciprocating the jaws of the pair of clamps to and apart from each other at each such predetermined interval;

iii. moving the block in the said last station in the fourth direction to its position from which it may be further moved to pass around the other blocks, thereby withdrawing the plug projecting from the said thus-moved block from the end of the pipe in which it had been inserted and retained, so that such pipe, as thus belled, will be discharged by the apparatus upon further incremental movement of the endless conveyor means;

iv. moving each other block in a station preceding said last station to the next station thereby vacating the first station and disposing a block in each succeeding station including said last station;

v. moving the block in its position from which it may be further moved to pass around the other blocks to its said further position in alignment with the first station, and, upon vacation of the first station, further in the first direction into the said vacated first station, whereupon the cylindrical plug projecting from the last moved block is forced into the pipe end which has just moved into the said first station by the endless conveyor said predetermined increment from the end of the heater area;

whereby a series of pipe ends may be sequentially and rapidly heated, belled, cooled to set the belled end, and discharged from the apparatus.

3. In a high speed plastic pipe belling apparatus having an endless conveyor means disposed to receive lengths of pipe sequentially and transversely deposited on said conveyor means and to convey said lengths of pipe periodically a predetermined distance in a first substantially horizontal direction, said conveyor means further having a series of receptacles thereabout each receptacle serving to receive and retain a pipe at a discrete location on said endless conveyor means as it moves periodically in said first direction; a positioning plate at one edge of the endless conveyor means; and continuously moving endless belt means, the last said means extending concurrently with, for at least a part of the course of said endless conveyor means, and the upper surface of said endless belt means being in contact with the lowermost portion of each pipe disposed in each of said receptacles, said endless belt means serving continuously to rotate said pipes, and to move each pipe vectorally transversely to the first direction toward the positioning plate until one end of said pipe abuts said stop plate; said stop plate being so disposed in relation to each length of pipe as to project the opposite end of each said pipe beyond the edge of the conveyor opposite that adjacent the stop plate, for heating and belling; said apparatus further having heater means disposed along a portion of the opposite edge of the endless conveyor means from that adjacent the stop means, and about the projecting end of each rotating pipe while said pipe in (i) disposed in a receptacle on said endless conveyor means, (ii) being rotated by said endless belt means and (iii) positioned with its distal end abutting said stop plate;

A. multiple station belling means, said belling means extending in said first direction from the end of said heater means; and comprising:

i. a first station including:

a. a pair of clamps having a pair of mating jaws, which jaws in their closed position define a cylindrical opening coaxial with the end of a pipe when it is disposed in said first station after having been moved past said heater means, and, said opening being of the desired outside diameter for the pipe end being belled, said clamps being reciprocable between a first position in which said opening is so defined, and a second position in which said jaws are suffciently separated from each other to permit a pipe end to be moved in said first direction in and out of said first belling station; and b. means to effect such reciprocation of said jaws at predetermined intervals;

ii. at least one other station adjacent and parallel to said first station said at least one other station including an air cooling area in which a belled pipe end may be retained for a predetermined cooling period;

iii. air blower means directing cooling air into said area;

iv. a plurality of blocks from each of which extends in said second direction a bevelled-ended cylindrical plug, each of said blocks being movable;
  a. in said first direction at said predetermined increments from said first station to the last of said other stations;
  b. from said last station in said first direction a predetermined distance to a position from which the block may be further moved to pass around the other blocks while the latter are disposed in their second and other respective stations;
  c. from said position around the other blocks in a fifth direction to another position in alignment with said first station for return movement therewith; and
  d. from the last said position, in said fourth direction back in to the first station;

v. the said plug in each block, upon the last said movement of the block back in to the first station, being inserted in the pipe end then disposed in the said first station and in said cylindrical opening, to expand said pipe end to where the outside surface of the pipe end is pressed outwardly against the walls defining said opening; and said thus inserted plug being retained in the pipe end as its block moves from said first station progressively to the last of said other stations, whereupon, when the block is moved in the first direction, the plug is withdrawn from the pipe end, and the thus-belled pipe may thereafter be discharged from the apparatus by said endless conveyor means; and B. synchronized power means, said means, when triggered to commence operation, initiating a cycle which includes:
  i. providing at predetermined intervals movement of said endless conveyor a predetermined increment in said first direction;
  ii. reciprocating the jaws of the pair of clamps to and apart from each other at each such predetermined interval;
  iii. moving the block in the said last station in the first direction to its position from which it may be further moved to pass around the other blocks, thereby withdrawing the plug projecting from the said thus-moved block from the end of the pipe in which it had been inserted and retained, so that such pipe, as thus belled, will be discharged by the apparatus upon further incremental movement of the endless conveyor means;
  iv. moving each other block in a station preceding said last station to the next station thereby vacating the first station and disposing a block in each succeeding station including said last station;
  v. moving the block in its position from which it may be further moved to pass around the other blocks to its position in alignment with the first station, and, upon vacation of the first station, further in the first direction into the said vacated first station, whereupon the cylindrical plug projecting from the last moved block is forced into the pipe end which has just moved into the said first station by the endless conveyor said predetermined increment from the end of the heater area;

whereby a series of pipe ends may be sequentially and rapidly heated, belled, cooled to set the belled end, and discharged from the apparatus.

4. Pipe belling apparatus, said apparatus comprising a heater, a multiple station belling unit, an endless conveyor, and a powered transmission system
  A. said heater having a heating element extending adjacent a linear area,
  B. said belling unit having
    i. a series of belling stations the first of which is disposed in the vicinity of the end of said linear area;
    ii. a plurality of mandrels each adapted to be inserted in a pipe disposed in the first of said belling stations and transversely to said linear area, then moved incrementally and periodically from said first station into each of said other belling stations substantially in the same direction as that of said linear area, then transversely from said direction, next oppositely to said direction and finally transversely back to said linear area,
    iii. semi-circular clamping means, said means being reciprocable between a first position wherein they are brought together and grip a pipe in the first belling station at a point near, but inwardly from the heated end of said pipe, and a second position wherein said clamping means are spaced from each other, and
    iv. air cooling means directing a flow of cooling air onto each pipe end after a mandrel has been inserted therein for at least a portion of the time the pipe end is disposed in each belling station;
  C. said endless conveyor receiving pipes, one end of each of which is to be belled, rotatingly moving each said pipe end incrementally and periodically through said linear area to expose the same to the heater for softening, then passing each pipe end sequentially into each of the belling stations in said belling unit, and finally discharging the same from the apparatus; and
  D. the powered transmission system providing power to operate the carrier and the belling unit and including synchronizing means whereby said carrier means and belling unit are synchronized in their respective movements, so that as a pipe end is moved from the said linear area to the first belling station in the belling unit, the clamping means are brought into their first position and a mandrel is inserted into the pipe end, cooling air flow is initiated, the clamping means are then reciprocated to their second position, and the pipe end with the mandrel inserted is then moved sequentially into each of the others of the series of belling stations for further cooling until the last station is reached, whereupon the mandrel is withdrawn from the pipe end and the pipe is discharged from the apparatus.

5. The apparatus as described in Claim 4 wherein a stripping plate is also provided in the last belling station to enable the mandrel to be withdrawn from the pipe end without distorting the same.

6. The apparatus as described in claim 4 wherein closeable damper means are provided between the air cooling means and the belling stations, said damper means being operated by the clamping means during a portion of the reciprocation thereof to shut off the flow of cooling air to the belling stations at the proper instant, in order to prevent premature cooling prior to belling of a pipe end as it enters the first belling station, and during the last portion of mandrel insertion, to permit such air flow not sooner than but at the earliest desirable instant following full insertion of the mandrel.

7. The apparatus as described in claim 4 wherein automatically actuated damper means deliver and shut off cooling air at the most desirable instants, thereby to permit the air cooling means to operate continuously.

8. The apparatus as described in claim 4 wherein the synchronizing means comprises a series of clutches and circular cams set to actuate the several moving elements of the apparatus at predetermined relative periods of time and sequences and at predetermined angles of rotation of the transmission components.

9. The apparatus as described in claim 4 wherein the heater and belling unit are disposed on a platform the level of which may be raised or lowered in relation to the level at which pipes are carried on the carrier means and the inside diameter of the clamping means and one of the mandrels may be changed, whereby the size of the pipes belled by the apparatus may be changed.

10. The apparatus as described in claim 4 wherein each mandrel is mounted to extend laterally from a block, said block being recessed across its bottom and on the side opposite that from which the mandrel extends; a second endless carrier means is disposed below the belling stations to move parallel to the endless conveyor, said second endless carrier means having a plurality of projections each of which may be slidably received in the bottom recess of a block when said block and its mandrel are moved back to the first belling station, said second endless carrier means being indexed to move simultaneously with the first carrier means; a first beaded rod is provided, the bead of said rod being receivable in and removable from the recess in the back of each block when the block is moved parallel to the path of the endless carrier means, said first rod reciprocating transversely to said path between a first position in the recess of a block when in the first belling station, and a second position remote from said belling station to the rear of the other blocks; and a second beaded rod similar and parallel to the first beaded rod and reciprocable between a first position with its bead received in the recess in the rear of a block in the last belling station and a second position remote from said belling station to the rear of the other blocks; and means to move a block from its disposition to the rear of the other blocks to which it has been drawn when the bead of the second rod has been received in the recess in the rear of said block and said second rod has been reciprocated from its first to its second position, behind the other blocks to the disposition of the block when the bead of the first rod has been slid into the last said recess when said rod is in its second position; whereby each said block and its mandrel may be moved from each belling station to the next, starting in the first belling station, with the pipe end into which the block mandrel has been inserted, until the block is disposed in the last belling station, whereupon the second rod withdraws said block from said last belling station and reciprocates to its second position to dispose the block remotely from said last belling station and behind the other blocks, from which disposition said block is then pushed back in a path parallel to the endless carrier towards the bead of the first rod in its second position where said bead is received and from which said first rod reciprocates and block back to the first belling station.

11. The apparatus as described in claim 5 wherein one of both the clamping means and the stripping plates is disposed for upward movement and one for downward movement from their first to second positions on a common horizontal reciprocating member.

* * * * *